(12) United States Patent
Nishida et al.

(10) Patent No.: US 12,530,104 B2
(45) Date of Patent: Jan. 20, 2026

(54) MANAGEMENT METHOD, MANAGEMENT TERMINAL, AND MANAGEMENT SYSTEM

(71) Applicant: Yanmar Holdings Co., Ltd., Osaka (JP)

(72) Inventors: Yusuke Nishida, Okayama (JP); Tomoki Imai, Okayama (JP); Shogo Otomo, Osaka (JP); Susumu Kawai, Osaka (JP)

(73) Assignee: Yanmar Holdings Co., Ltd., Osaka (JP)

( * ) Notice: Subject to any disclaimer, the term of this patent is extended or adjusted under 35 U.S.C. 154(b) by 256 days.

(21) Appl. No.: 17/840,558

(22) Filed: Jun. 14, 2022

(65) Prior Publication Data

US 2022/0413491 A1 Dec. 29, 2022

(30) Foreign Application Priority Data

Jun. 23, 2021 (JP) .................. 2021-103739

(51) Int. Cl.
*G06F 3/04817* (2022.01)
*A01B 69/04* (2006.01)
*G05D 1/00* (2006.01)
*G06F 3/0482* (2013.01)
*G06F 3/0484* (2022.01)
*G06F 8/61* (2018.01)
(Continued)

(52) U.S. Cl.
CPC ........ *G06F 3/04817* (2013.01); *A01B 69/008* (2013.01); *G05D 1/0027* (2013.01); *G06F 3/0482* (2013.01); *G06F 3/0484* (2013.01);

*G06F 8/61* (2013.01); *G06F 9/451* (2018.02); *G06F 11/1469* (2013.01); *G06F 2201/805* (2013.01)

(58) Field of Classification Search
None
See application file for complete search history.

(56) References Cited

U.S. PATENT DOCUMENTS

| 10,740,121 | B2   | 8/2020 | Jann et al. |         |
|------------|------|--------|-------------|---------|
| 10,901,408 | B2 * | 1/2021 | Gresch ................. | A01B 69/008 |
| 2002/0133505 | A1 * | 9/2002 | Kuji ........................ | G06Q 30/02 |

(Continued)

FOREIGN PATENT DOCUMENTS

JP 2017107513 A 6/2017

*Primary Examiner* — Toan H Vu
(74) *Attorney, Agent, or Firm* — Chris Mizumoto

(57) ABSTRACT

A management terminal, which manages one of a tractor, a rice transplanter, and a combine harvester, as a plurality of types of work machines that perform a plurality of types of work, respectively, on a field, is provided with a storage portion which stores a management application for managing the plurality of types of work machines, a control device which activates the management application, and a display portion. When the control device activates the management application, the control device displays, on the display portion, a plurality of app activation icons corresponding to the plurality of types of work machines, respectively, in such a way that the plurality of app activation icons are selectively operable. Also, the control device activates, in response to selective operation of any one of the plurality of app activation icons, an individual application for operating the work machine corresponding to the selectively operated app activation icon.

20 Claims, 23 Drawing Sheets

(51) Int. Cl.
*G06F 9/451* (2018.01)
*G06F 11/14* (2006.01)

(56) References Cited

U.S. PATENT DOCUMENTS

| | | | |
|---|---|---|---|
| 2006/0041845 A1* | 2/2006 | Ferguson | G06F 9/451 |
| | | | 715/751 |
| 2010/0063608 A1* | 3/2010 | Miller | G05B 19/409 |
| | | | 700/185 |
| 2014/0258928 A1* | 9/2014 | Brush | G06F 3/0482 |
| | | | 715/810 |
| 2016/0183447 A1* | 6/2016 | Buhler | G06Q 50/02 |
| | | | 701/50 |
| 2017/0344218 A1 | 11/2017 | Jann et al. | |
| 2018/0329618 A1* | 11/2018 | Wieckhorst | G06F 3/04886 |
| 2018/0329620 A1* | 11/2018 | Cabrespine | G05D 1/0278 |
| 2020/0173147 A1* | 6/2020 | Hasegawa | B62D 49/00 |
| 2020/0399863 A1* | 12/2020 | Aizawa | G06Q 10/10 |
| 2022/0230523 A1* | 7/2022 | Kobel | G06Q 30/0641 |

* cited by examiner

MANAGEMENT METHOD, MANAGEMENT TERMINAL, AND MANAGEMENT SYSTEM

CROSS-REFERENCE

This application claims foreign priority of JP2021-103739 filed Jun. 23, 2021, the disclosure of which is hereby incorporated by reference in its entirety.

TECHNICAL FIELD

The present invention relates to a management method, a management terminal, and a management system for managing a plurality of types of work machines that perform a plurality of types of work, respectively, on the same work area.

BACKGROUND ART

In order to perform work at a work area, such as a field, by a work machine such as a farmwork machine, an operator is required to manage the work machine and the work area. Conventionally, a technology to manage a work machine and a work area by imparting a management function to a terminal attached to the work machine, and using a display portion or the like provided on the terminal is known.

For example, a field management system of Patent Document 1 is provided with a mobile terminal which stores field information including field positional information with respect to each of a plurality of fields, and displays the field information. The mobile terminal displays the field information regarding all of or a part of the plurality of fields, on the basis of each distance between each position of the plurality of fields obtained by using the field positional information and a measured position. Further, a workplace management system of Patent Document 2 is provided with: a workplace map acquisition portion which acquires a first workplace map in which a field position that is set on a field, and shape data of a workplace are associated with each other; a machine position acquisition portion which acquires a machine position of a work machine that is made to move in the workplace; and a workplace correction portion which corrects, on the basis of the machine position, the relationship between the field position and the shape data of the workplace. The workplace map acquisition portion, the machine position acquisition portion, and the workplace correction portion are provided in a management device (a computer). The management device is a display device mounted on a tractor.

PRIOR ART DOCUMENT

Patent Document

Patent Document 1: Japanese Unexamined Patent Application Publication No. 2019-24383
Patent Document 2: Japanese Unexamined Patent Application Publication No. 2019-120723

SUMMARY OF INVENTION

Technical Problem

Meanwhile, since an operator may perform work on a work area, such as a plurality of fields, by a work machine such as a farmwork machine, he/she is required to manage a plurality of work areas. Also, the operator may perform different types of work on the same work area. For example, it is considered that different types of farmwork such as plowing, rice planting, and reaping are performed on the same field. Therefore, the operator is required to manage not only the plurality of work areas but also a plurality of types of work machines that perform a plurality of types of work, respectively, on the same work area. However, with the conventional technology, it is complicated and difficult to manage, while managing a plurality of work areas, a plurality of types of work machines that perform different types of work, respectively, on the same work area.

An object of the present invention is to provide a management method, a management terminal, and a management system capable of easily managing a plurality of types of work machines.

Solution to Problem

In order to solve the problem described above, a management method of the present invention pertains to a management method of managing a plurality of types of work machines that perform a plurality of types of work, respectively, on the same work area, and is characterized by including: a first activation process of activating, in a terminal of an operator, a management application for managing the plurality of types of work machines; a display control process of displaying, by the management application, a plurality of app activation icons, which respectively correspond to the plurality of types of work machines, to be selectively operable on a display portion of the terminal; and a second activation process of activating, in response to selective operation of any one of the plurality of app activation icons, an individual application for operating the work machine corresponding to the selectively operated app activation icon, in the terminal.

Further, in order to solve the problem described above, a management terminal of the present invention pertains to a management terminal which manages a plurality of types of work machines that perform a plurality of types of work, respectively, on a field, in which the management terminal includes: a storage portion which stores a management application for managing the plurality of types of work machines; a control device which activates the management application; and a display portion, and is characterized in that the control device displays, when the management application is activated, a plurality of app activation icons, which respectively correspond to the plurality of types of work machines, to be selectively operable on the display portion, and activates, in response to selective operation of any one of the plurality of app activation icons, an individual application for operating the work machine corresponding to the selectively operated app activation icon.

Furthermore, in order to solve the problem described above, a management system of the present invention pertains to a management system which manages a plurality of types of work machines that perform a plurality of types of work, respectively, on a field, and is characterized in that the management system activates, in a terminal of an operator, a management application for managing the plurality of types of work machines; displays, by the management application, a plurality of app activation icons, which respectively correspond to the plurality of types of work machines, to be selectively operable on a display portion of the terminal; and activates, in response to selective operation of any one of the plurality of app activation icons, an individual application for operating the work machine corresponding to the selectively operated app activation icon, in the terminal.

Advantageous Effects of Invention

According to the present invention, a management method, a management terminal, and a management system capable of easily managing a plurality of types of work machines are provided.

DESCRIPTION OF EMBODIMENTS

Figure 1:
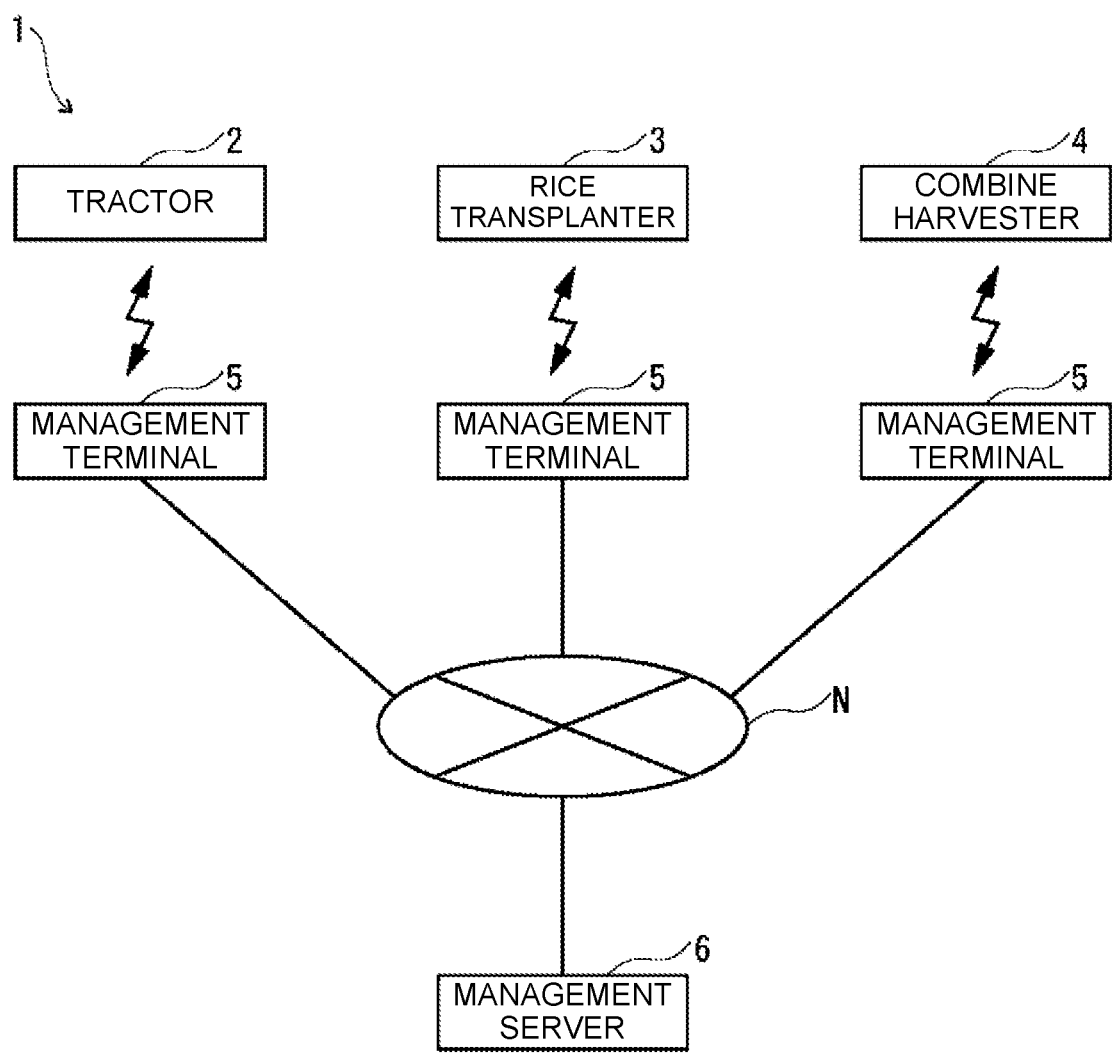
FIG. 1 is a block diagram illustrating a management system according to an embodiment of the present invention.

A management system 1 as an embodiment of the present invention will be described with reference to the drawings. As illustrated in FIG. 1, the management system 1 includes a plurality of types of farmwork machines, such as a tractor 2, a rice transplanter 3, and a combine harvester 4, as the work machines to be managed by an operator. The management system 1 also includes a plurality of management terminals 5, which are respectively attached to the plurality of types of work machines (the tractor 2, the rice transplanter 3, and the combine harvester 4), and a management server 6 capable of communicating with the plurality of management terminals 5. The management system 1 is configured to manage a plurality of types of work machines used by the operator, and a plurality of work areas (e.g., fields).

The tractor 2, the rice transplanter 3, and the combine harvester 4, as the plurality of types of work machines, perform different types of work on the same work area. For example, the aforementioned machines perform different types of farmwork such as plowing, rice planting, and reaping, on the same field. The tractor 2, the rice transplanter 3, and the combine harvester 4, are provided with communication devices (not shown), and are each connected to the corresponding management terminal 5 in such a way that wireless communication can be performed. The tractor 2, the rice transplanter 3, and the combine harvester 4 perform farmwork of a field. Together with that, the aforementioned machines measure field data (the shape, size and positional information, etc., of a field edge constituting a field outer periphery) related to the field, and send the field data, which is the measurement result, to each of the corresponding management terminals 5.

Note that the tractor 2, the rice transplanter 3, and the combine harvester 4 may be configured as an autonomous traveling vehicle which travels autonomously along a preset travel route. In this case, the tractor 2, the rice transplanter 3, and the combine harvester 4 are controlled such that they receive the field data and the travel route from each of the corresponding management terminals 5, and travel autonomously in accordance with the received field data and travel route. In addition, the tractor 2, the rice transplanter 3, and the combine harvester 4 each have work machine data as setting information regarding travel and work (plowing, rice planting, and reaping, etc.) of the work machine, and control the autonomous traveling on the basis of the work machine data.

The management server 6 is connected to the management terminals 5 respectively corresponding to the tractor 2, the rice transplanter 3, and the combine harvester 4, such that wireless communication can be performed via a predetermined network N such as the Internet. The management server 6 stores login information with which each worker and each management terminal 5 can be identified, and receives login processing of each of the management terminals 5 using the login information.

Also, the management server 6 stores notification information regarding management of the plurality of types of work machines (the tractor 2, the rice transplanter 3, and the combine harvester 4). The management server 6 sends, in response to a notification information request made by a logged-in management terminal 5, the notification information to the management terminal 5.

The management server 6 stores, for each operator, work machine data concerning each of the plurality of types of work machines managed by the operator, i.e., work machine data concerning each of the tractor 2, the rice transplanter 3, and the combine harvester 4, for example, in the present embodiment. The work machine data is setting information regarding travel and work (plowing, rice planting, and reaping, etc.) of the work machine. The work machine data includes, for example, a vehicle body length, a vehicle body width, a work width, and a turning radius. When an individual application for operating the work machine is installed on the management terminal 5, the work machine data is used in the individual application of the corresponding work machine. The management server 6 accepts a backup and a restore of the work machine data from the logged-in management terminal 5. That is, the management server 6 receives and stores the work machine data from the management terminal 5 in accordance with a backup instruction, and sends the work machine data to the management terminal 5 in accordance with a restore instruction.

Also, the management server 6 stores, for each operator, work area data concerning each of a plurality of work areas managed by the operator, i.e., field data concerning a field, for example, in the present embodiment. The management server 6 accepts save and management of the field data from the logged-in management terminal 5. That is the management server 6 receives and stores the field data from the management terminal 5 in accordance with a save instruction, and sends, to the management terminal 5, the field data pertaining to each operator in accordance with a management instruction.

Also, the management server 6 stores each of instruction manuals (manuals) for the plurality of types of work machines (the tractor 2, the rice transplanter 3, and the combine harvester 4). The management server 6 sends, in response to a download request for an instruction manual made by the logged-in management terminal 5, the instruction manual to the management terminal 5.

Also, the management server 6 stores various applications to be installed on each of the management terminals 5. For example, in the present embodiment, the management server 6 stores a management application for managing the plurality of types of work machines (the tractor 2, the rice transplanter 3, and the combine harvester 4), and the individual applications for operating the respective work machines. The management server 6 sends, in response to an application installation request made by the logged-in management terminal 5, an installer of an application to the management terminal 5, and sends, in response to an update request, an update file of the application to the management terminal 5.

The plurality of management terminals 5 are terminals that can remotely control the tractor 2, the rice transplanter 3, and the combine harvester 4, as the plurality of types of work machines, respectively. The management terminal 5 is configured from, for example, a tablet terminal provided with a touch panel, a smartphone, a laptop personal computer, or the like.

Each of the management terminals 5 is preliminarily equipped with the individual application for operating the corresponding work machine among the tractor 2, the rice transplanter 3, and the combine harvester 4. More specifically, the management terminal 5 corresponding to the tractor 2 is preliminarily equipped with an individual application for operating the tractor 2; the management terminal 5 corresponding to the rice transplanter 3 is preliminarily equipped with an individual application for operating the rice transplanter 3; and the management terminal 5 corresponding to the combine harvester 4 is preliminarily equipped with an individual application for operating the combine harvester 4. In addition, each of the management terminals 5 can be equipped with an individual application for operating the other work machines, i.e., an individual application other than the individual application with which the management terminal 5 is preliminarily equipped, by installing such an individual application afterward. Each of the management terminals 5 can download the individual application from the management server 6, for example.

Each of the management terminals 5 can be equipped with the management application for managing the plurality of types of work machines (the tractor 2, the rice transplanter 3, and the combine harvester 4) used by the operator, and the plurality of work areas (fields) by having the management application installed. Each of the management terminals 5 can download the management application from the management server 6, for example.

The plurality of management terminals 5 may be configured in the same way except for the type of individual application to be installed. Therefore, one management terminal 5 will be described below. It is assumed that the management terminal 5 to be described below has the management application installed.

Moreover, it is assumed that registered machine information (an activation key) specific to the work machine, such the tractor 2, the rice transplanter 3, and the combine harvester 4, used by the operator, is written in advance in the management terminal 5 to be described below. The registered machine information is information that is issued from an issuance server (not shown), and is registered in the issuance server. The management terminal 5 may register the registered machine information for each of the plurality of types of work machines. However, the registered machine information that can be registered for each type of work machine is only for the work machine of a single model number (classification information). The work machine of the model number which has been registered in this way is brought into an activation state in the management terminal 5. The registered machine information is written in a database within the individual application when the individual application of the work machine is installed on the management terminal 5. The registered machine information includes, for example, an app name of the individual application of the work machine, contract information regarding autonomous traveling of the work machine, work machine identification information (a serial number) to be assigned for each work machine, and the status of an obstacle sensor provided in the work machine. As a backup function, the individual application sends the registered machine information to the management server 6 to have the registered machine information stored. As another example, the management application may integrate and manage pieces of the registered machine information written to the individual applications of the work machines, respectively, in the management terminals 5. As yet another example, the management application may send the registered machine information, which is written to the individual application of each work machine in the management terminal 5, to the management server 6 such that the written registered machine information is associated with the management terminal 5, and pieces of the registered machine information that have been sent may be integrated and managed at the management server 6.

Figure 2:
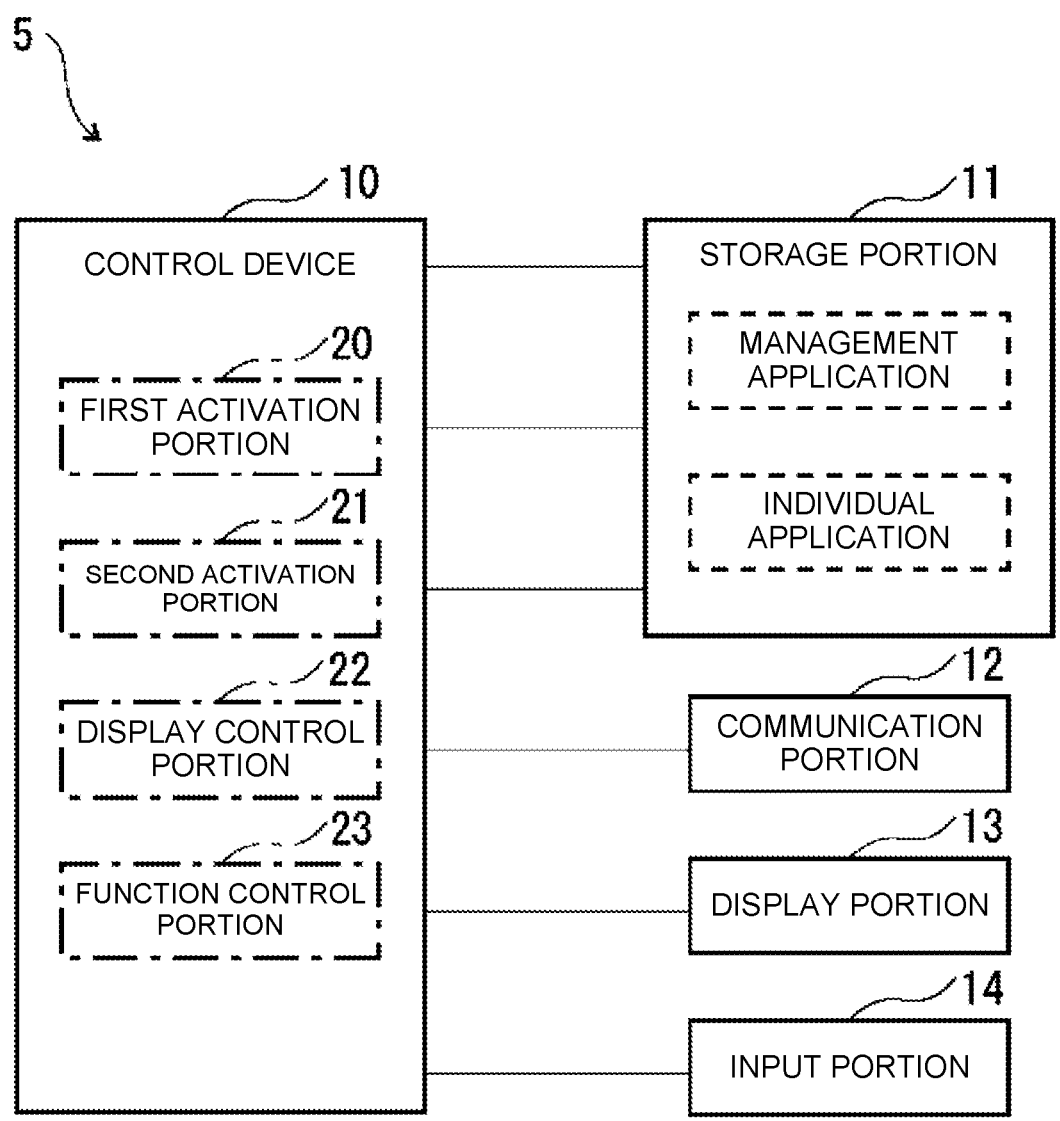
FIG. 2 is a block diagram illustrating a management device according to an embodiment of the present invention.

As illustrated in FIG. 2, the management terminal 5 is provided with a control device 10 which is configured from a computer such as a CPU. The control device 10 is connected to a storage portion 11 such as a ROM, a RAM, a hard disk drive, and a flash memory, and a communication portion 12 which communicates with an external device. Also, the management terminal 5 is provided with a display portion 13 such as a touch panel and a monitor for displaying various kinds of information and outputting the same to the operator. Furthermore, the management terminal 5 is provided with an input portion 14 such as a touch panel and operation keys for receiving an operation of input of various kinds of information from the operator.

The storage portion 11 stores programs and data for controlling various constituent elements and various functions of the management terminal 5. The control device 10 executes arithmetic processing on the basis of the programs and data stored in the storage portion 11, thereby controlling the various constituent elements and the various functions of the management terminal 5. The storage portion 11 stores, for example, the management application and the individual applications.

The communication portion 12 is connected to the communication device of the work machine such as the tractor 2, the rice transplanter 3, or the combine harvester 4, and the management server 6, via a wireless communication antenna, in such a way that wireless communication can be performed. The control device 10 controls the communication portion 12 and performs wireless communication with the communication device of the work machine and the management server 6, so that various kinds of information are transmitted to and received from the communication device and the management server 6.

In response to activation of the management terminal 5 or an operation of the input portion 14, the control device 10 is operated as a first activation portion 20 which activates the management application, and a second activation portion 21 which activates the individual application. The control device 10, which executes the management application, is operated as a display control portion 22 that displays various screens of the management application on the display portion 13. In addition, the control device 10, which executes the management application, is operated as a function control portion 23 that executes, in response to an operation on each screen of the management application, each function of the management application.

The first activation portion 20, the second activation portion 21, the display control portion 22, and the function control portion 23 respectively realize a first activation process, a second activation process, a display control process, and a function control process of a management method according to the present invention.

Figure 3:
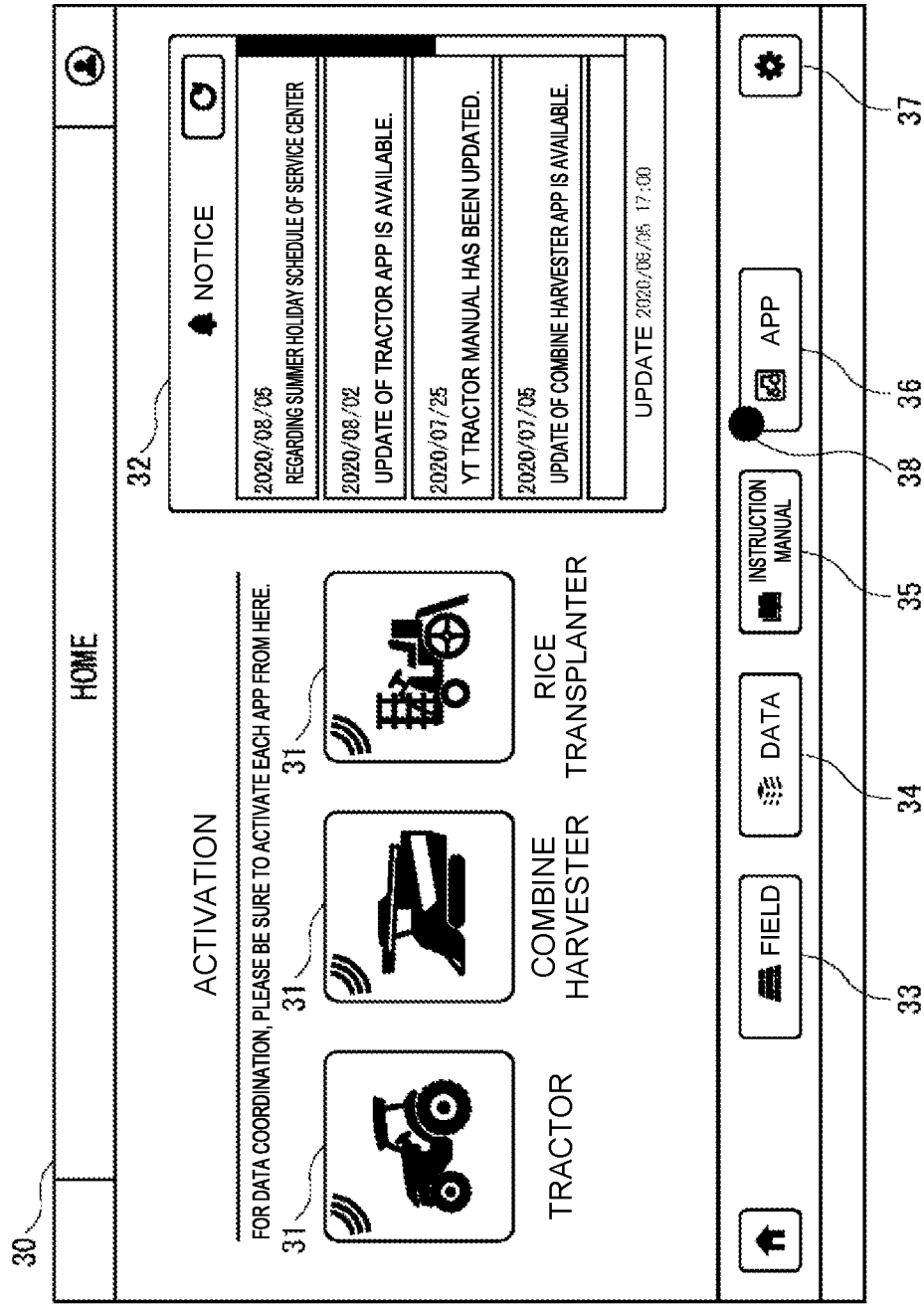
FIG. 3 is a front view illustrating an example of a home screen in the management device according to an embodiment of the present invention.

When the first activation portion 20 activates the management application in response to the activation of the management terminal 5, the display control portion 22 first displays a home screen 30, as shown in FIG. 3, on the display portion 13. The display control portion 22 displays, on the home screen 30, a plurality of app activation icons 31, which respectively correspond to the tractor 2, the rice transplanter 3, and the combine harvester 4, as the plurality of types of work machines, and perform activation operation of activating the respective individual applications, in such a way that the plurality of app activation icons 31 can be selectively operated. Note that the home screen 30 may display an already-installed work machine, which is the work machine in which the individual application is already installed on the management terminal 5, and a yet-to-be installed work machine, which is the work machine in which the individual application is yet to be installed, in such a way that the work machines are displayed distinguishably from each other. For example, while the app activation icon 31 corresponding to the individual application which is yet to be installed is displayed to be grayed out or not displayed, the app activation icon 31 corresponding to the individual application which is already installed is displayed in a normal way to be selectively operable.

Figure 4:
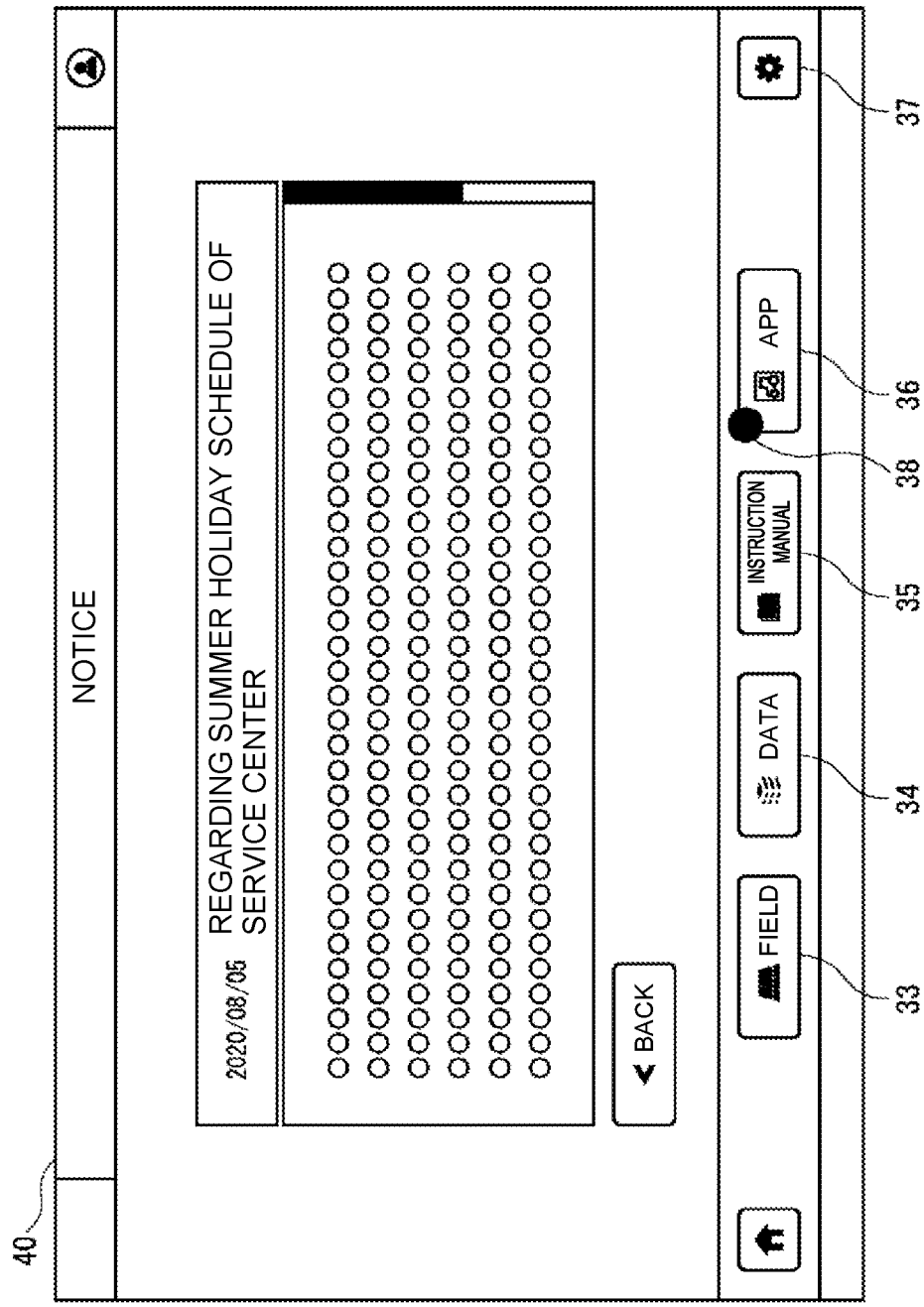
FIG. 4 is a front view illustrating an example of a detailed screen for notification information in the management device according to an embodiment of the present invention.

The display control portion 22 displays, on the home screen 30, a notification information field 32 in which selective operation can be performed to select notification information related to management of the work machines. For example, the display control portion 22 displays, as a list, selection items of the notification information in the notification information field 32. Each selection item in the notification information field 32 is made to display in a simplified way the notification date, subject, and the like of each piece of the notification information. When the notification information is selected from the notification information field 32 by the selective operation, the display control portion 22 displays, on the display portion 13, a detailed screen 40 for the selected notification information, as shown in FIG. 4. For example, the management terminal 5 receives, from the management server 6, the notification information to be displayed in the notification information field 32 at the time when the management application is activated, or every predetermined time interval during execution of the management application or at the time when information update operation is performed via the input portion 14. The display control portion 22 may display both of the notification information common to all operators and the notification information specific to each operator. Alternatively, the display control portion 22 may display only one of the above two.

The display control portion 22 displays, on the home screen 30, a field icon 33, a data icon 34, an instruction manual icon 35 (manual icon), an app icon 36, a settings icon 37, and the like, to be selectively operable. If there exists an application that can be updated or an application that can be installed, the display control portion 22 may add a symbol 38 indicating the existence of such an application to the app icon 36.

Figure 5:
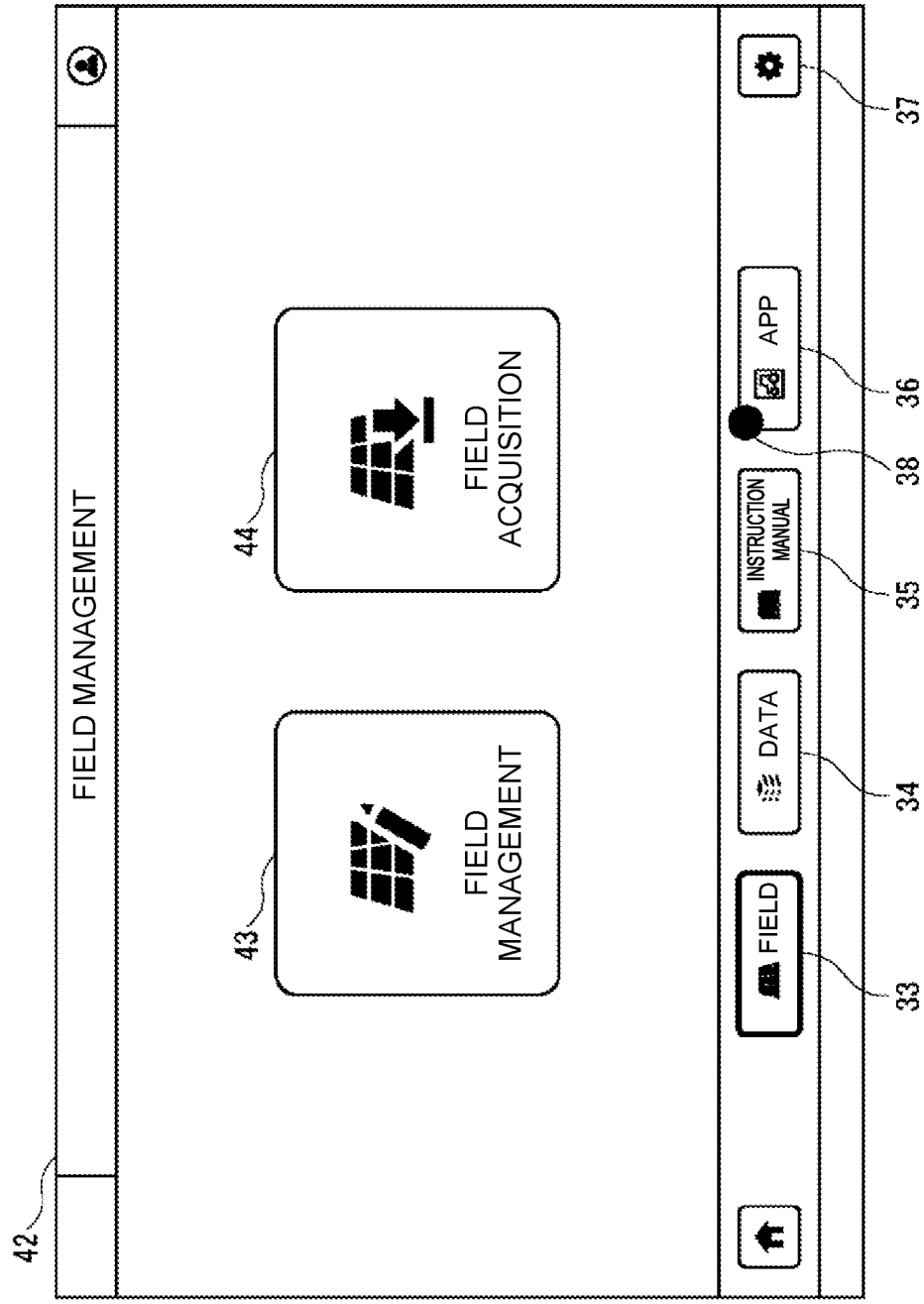
FIG. 5 is a front view illustrating an example of a field management screen in the management device according to an embodiment of the present invention.

When the field icon 33 is selectively operated, the display control portion 22 displays, on the display portion 13, a field management screen 42 for operation of data management of a field, which is the work area, as shown in FIG. 5. The display control portion 22 displays, on the field management screen 42, a field management icon 43 and a field acquisition icon 44 to be selectively operable.

Figure 6:
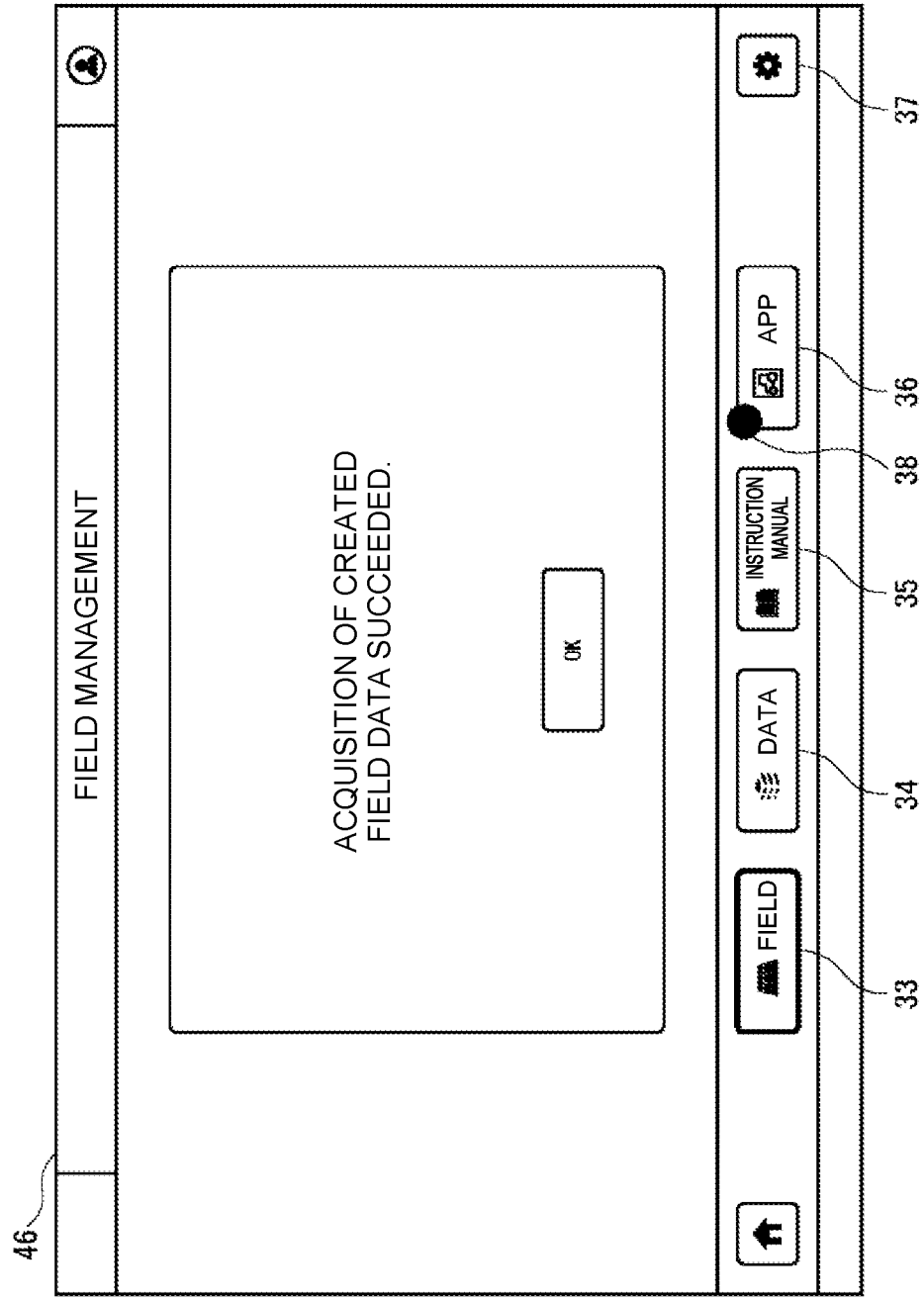
FIG. 6 is a front view illustrating an example of a created field data acquisition screen in the management device according to an embodiment of the present invention.
Figure 7:
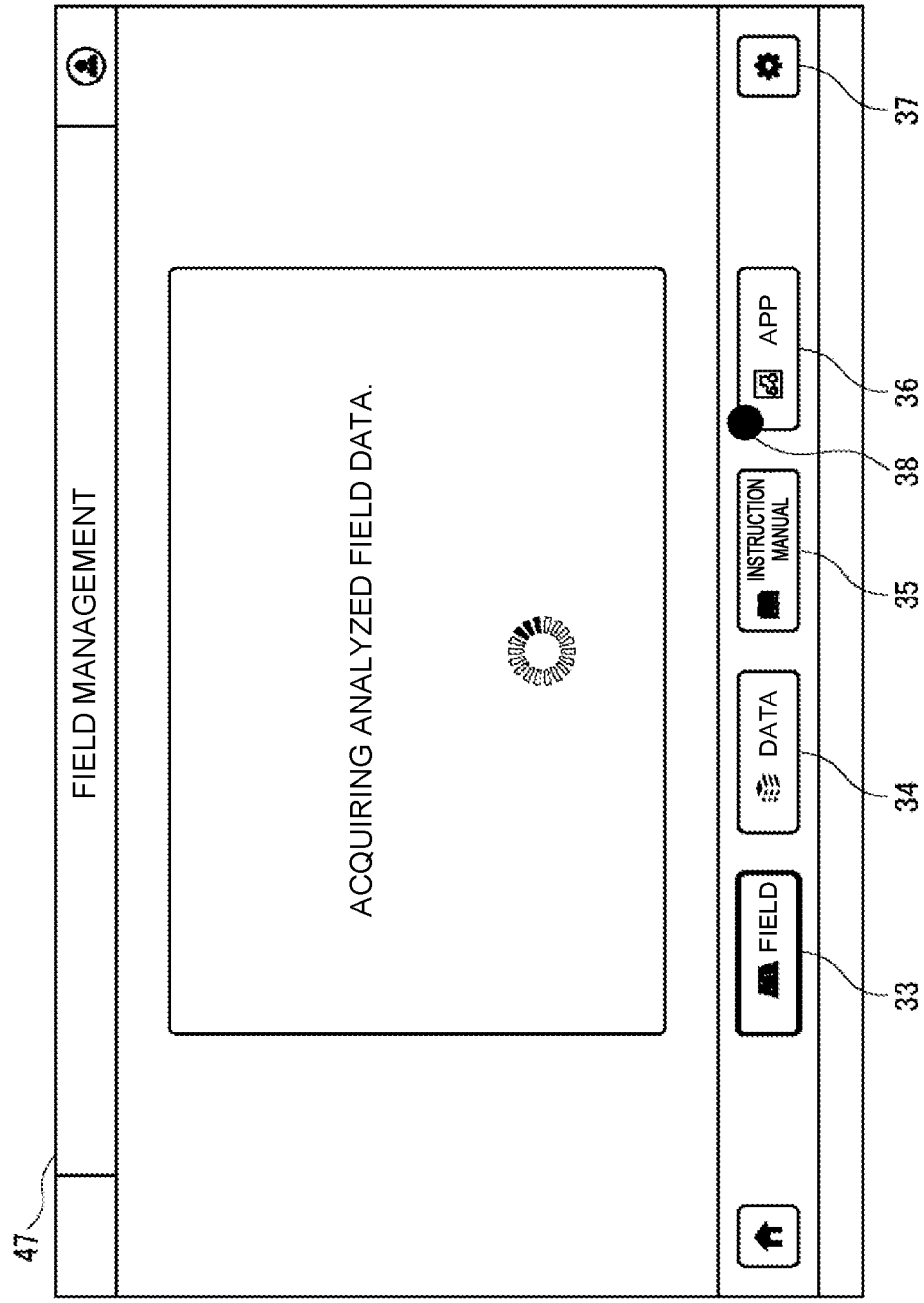
FIG. 7 is a front view illustrating an example of an analyzed field data acquisition screen in the management device according to an embodiment of the present invention.

When the field management icon 43 is selectively operated, the display control portion 22 displays, on the display portion 13, a created field data acquisition screen 46 indicating acquisition execution with respect to created field data, which has been created and registered by the operator on the basis of the past autonomous traveling of the tractor 2, the rice transplanter 3, or the combine harvester 4, as shown in FIG. 6. The created field data acquisition screen 46 presents, for example, success or failure of the acquisition of the created field data. Further, when the field acquisition icon 44 is selectively operated, the display control portion 22 displays, on the display portion 13, an analyzed field data acquisition screen 47 indicating acquisition execution with respect to analyzed field data, which has been analyzed from map data, as shown in FIG. 7. Although FIG. 7 shows the analyzed field data acquisition screen 47 presenting that the analyzed field data is being acquired, the display control portion 22 may display, on the display portion 13, a screen presenting acquisition completion of the analyzed field data.

Figure 8:
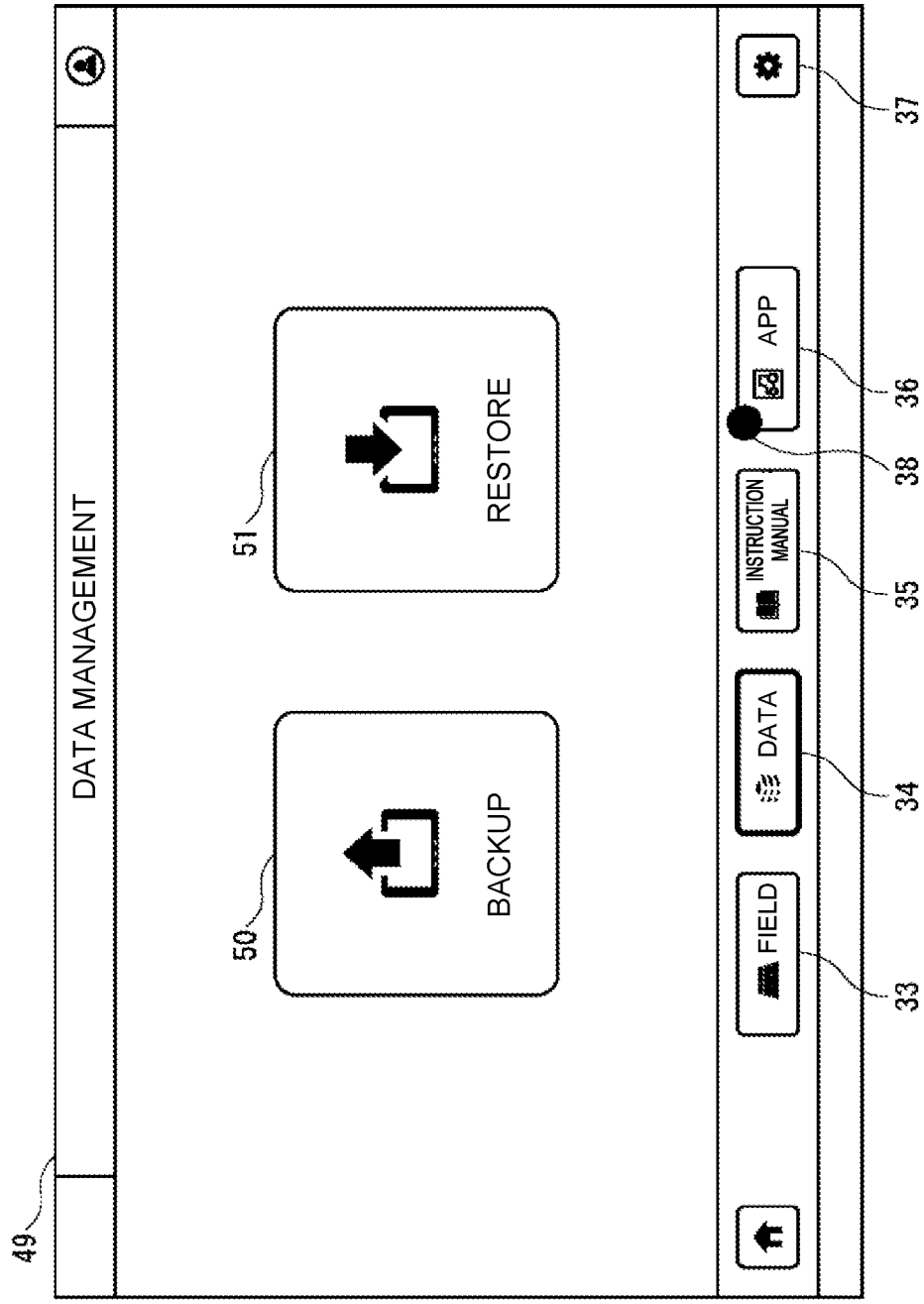
FIG. 8 is a front view illustrating an example of a data management screen in the management device according to an embodiment of the present invention.

When the data icon 34 is selectively operated, the display control portion 22 displays, on the display portion 13, a data management screen 49 for operation of data management of the work machine data concerning the plurality of types of work machines, as shown in FIG. 8. The display control portion 22 displays, on the data management screen 49, a backup icon 50 and a restore icon 51 to be selectively operable.

Figure 9:
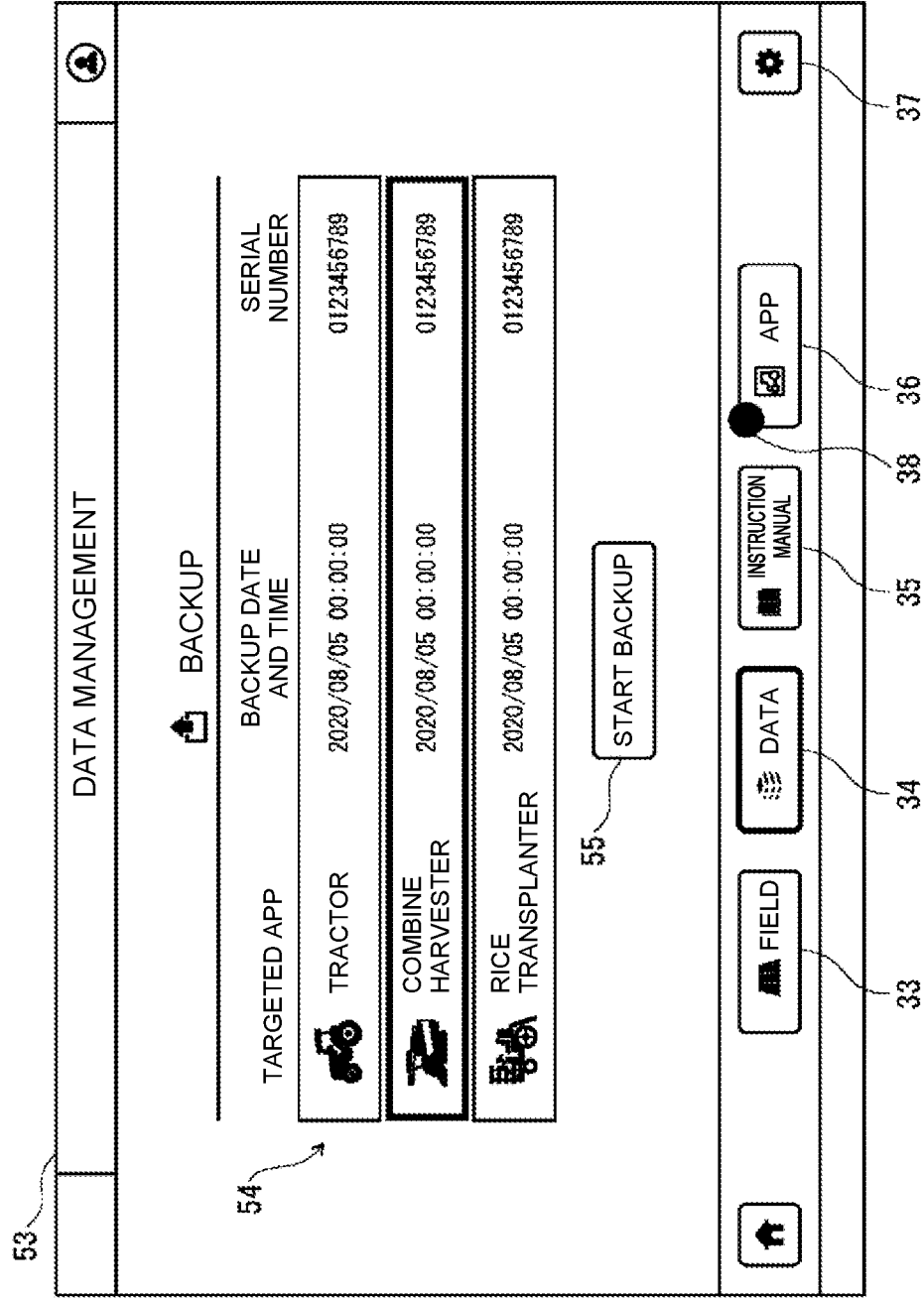
FIG. 9 is a front view illustrating an example of a backup management screen in the management device according to an embodiment of the present invention.

When the backup icon 50 is selectively operated on the data management screen 49, the display control portion 22 displays, on the display portion 13, a backup management screen 53 for operation of data backup of the work machine possessed by the operator, as shown in FIG. 9. The display control portion 22 displays, on the backup management screen 53, a backup selection field 54 in which selective operation can be performed to make a selection from among the work machines, such as the tractor 2, the rice transplanter 3, and the combine harvester 4, used by the operator. For example, the display control portion 22 displays, as a list, selection items of the work machines in the backup selection field 54. The backup selection field 54 may display the selection items for the work machines having the individual applications installed. Each selection item in the backup selection field 54 is made to display in a simplified way the type of work machine corresponding to each piece of the work machine data, the previous backup date and time of each piece of the work machine data, the work machine identification information (serial number), and the like.

The display control portion 22 operably displays, on the backup management screen 53, a determination button 55 which determines the selective operation of selecting the work machine in the backup selection field 54. The determination button 55 functions as a backup start button. Alternatively, the display control portion 22 may allow the selective operation of selecting the work machine in the backup selection field 54 to function as the backup start button.

Figure 10:
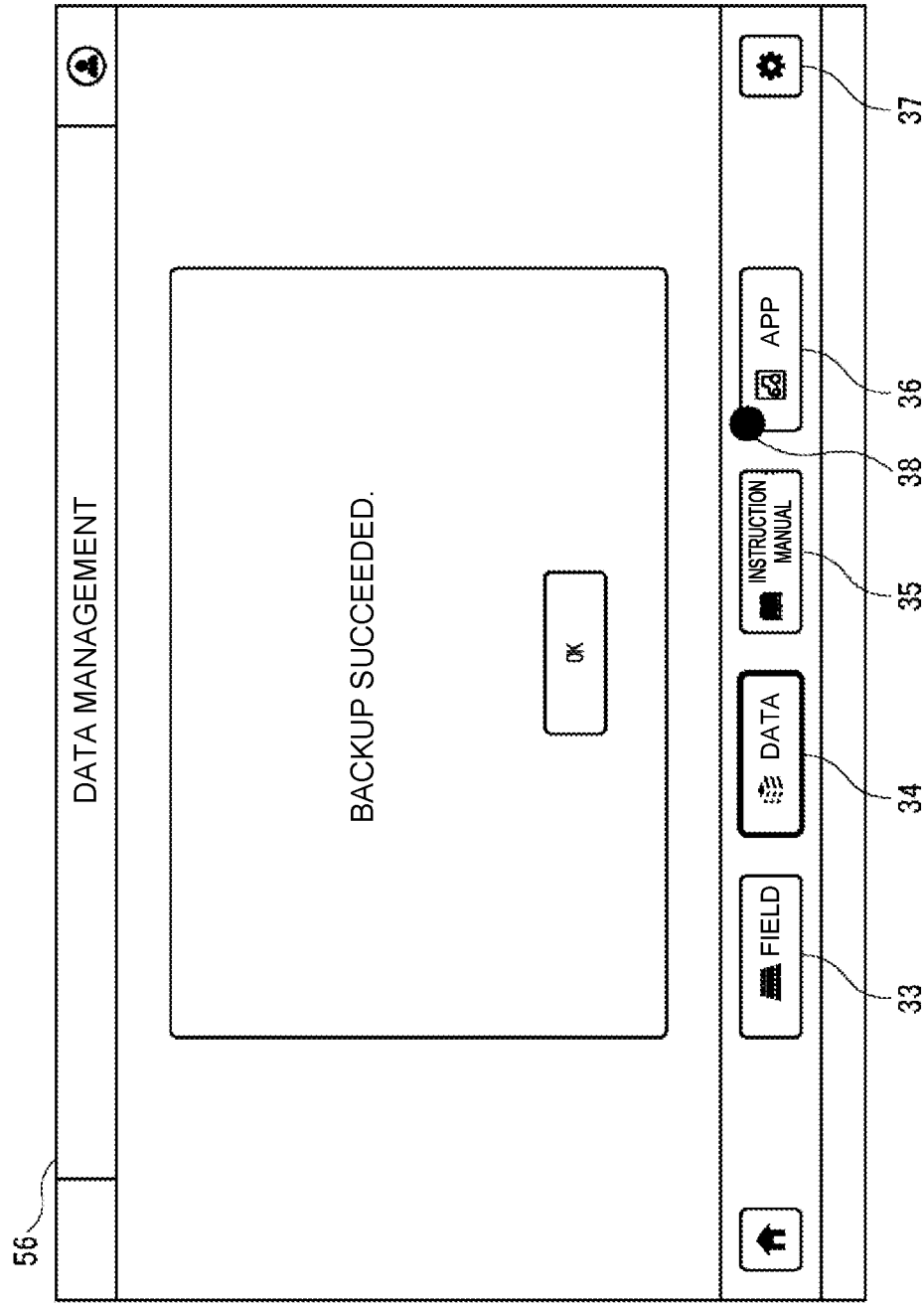
FIG. 10 is a front view illustrating an example of a backup execution screen in the management device according to an embodiment of the present invention.

When the work machine is selected from the backup selection field 54 by the selective operation and the data backup is executed, the display control portion 22 displays, on the display portion 13, a backup execution screen 56 indicating backup execution for the work machine data, with respect to the selected work machine, as shown in FIG. 10. The backup execution screen 56 presents, for example, success or failure of the data backup.

Figure 11:
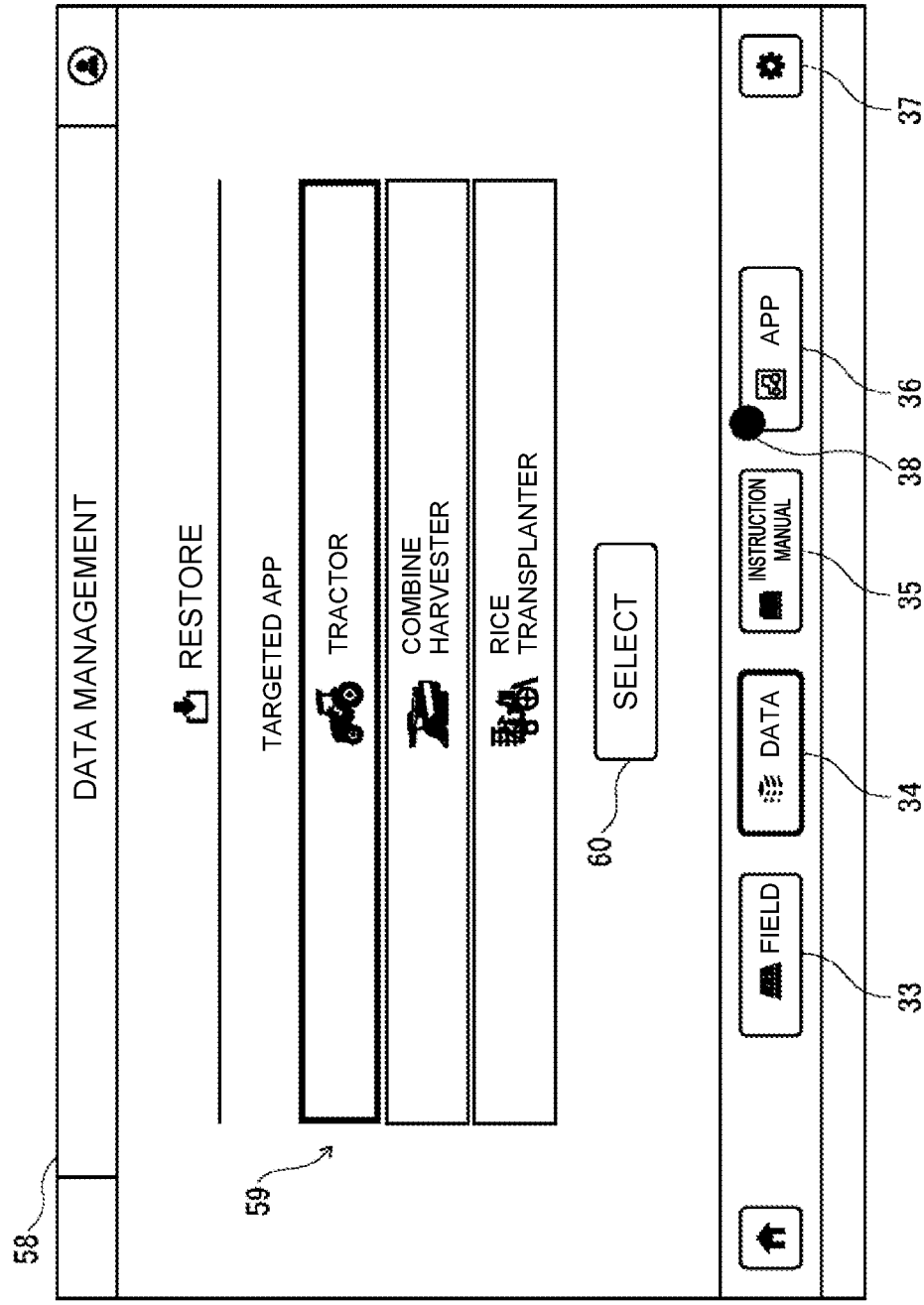
FIG. 11 is a front view illustrating an example of a restore management screen in the management device according to an embodiment of the present invention.

When the restore icon 51 is selectively operated on the data management screen 49, the display control portion 22 displays, on the display portion 13, a restore management screen 58 for operation of data restore of the work machine possessed by the operator, as shown in FIG. 11. The display control portion 22 displays, on the restore management screen 58, a restore selection field 59 in which selective operation can be performed to make a selection from among the work machines, such as the tractor 2, the rice transplanter 3, and the combine harvester 4, used by the operator. For example, the display control portion 22 displays, as a list, selection items of the work machines in the restore selection field 59. The restore selection field 59 may display the selection items for the work machines having the individual applications installed.

The display control portion 22 operably displays, on the restore management screen 58, a determination button 60 which determines the selective operation of selecting the work machine in the restore selection field 59. Alternatively, the display control portion 22 may allow the selective operation of selecting the work machine in the restore selection field 59 to function as the selection determination.

Figure 12:
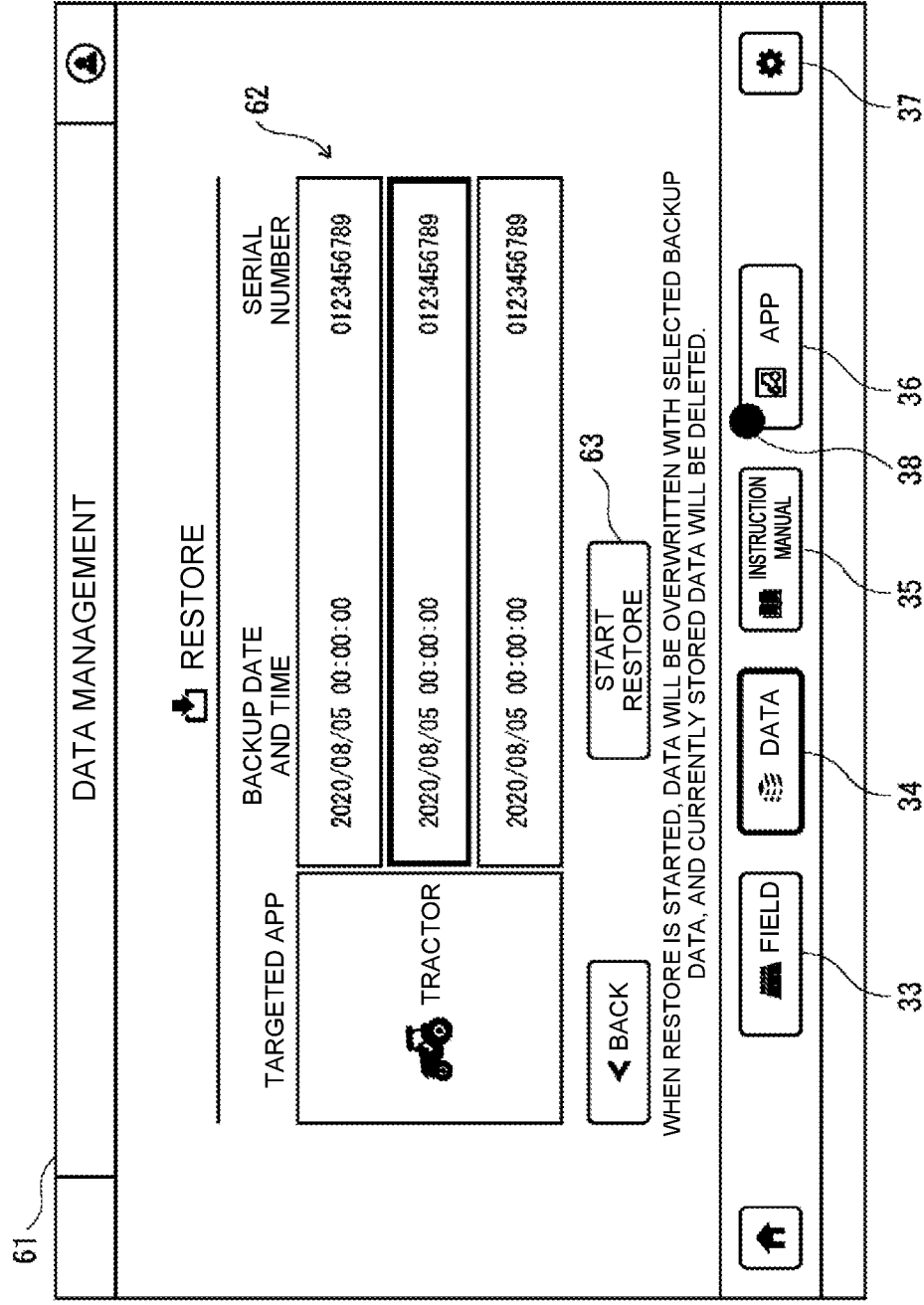
FIG. 12 is a front view illustrating an example of a data selection screen in the management device according to an embodiment of the present invention.

When the work machine is selected from the restore selection field 59 by the selective operation, the display control portion 22 displays, on the display portion 13, a data selection screen 61 for selecting the backup data to restore the work machine data, with respect to the selected work machine, as shown in FIG. 12. The display control portion 22 displays, on the data selection screen 61, a data selection field 62 in which selective operation can be performed to make a selection from among pieces of work machine data (backup data) which have been backed up in the past, with respect to the work machine selected from the restore selection field 59. For example, the display control portion 22 displays, as a list, selection items of the backup data in the data selection field 62. Each selection item in the data selection field 62 is made to display in a simplified way the backup date and time of the backup data, the work machine identification information (serial number), and the like.

The display control portion 22 operably displays, on the data selection screen 61, a determination button 63 which determines the selective operation of selecting the backup data in the data selection field 62. The determination button 63 functions as a restore start button. Alternatively, the display control portion 22 may allow the selective operation of selecting the backup data in the data selection field 62 to function as the restore start button.

Figure 13:
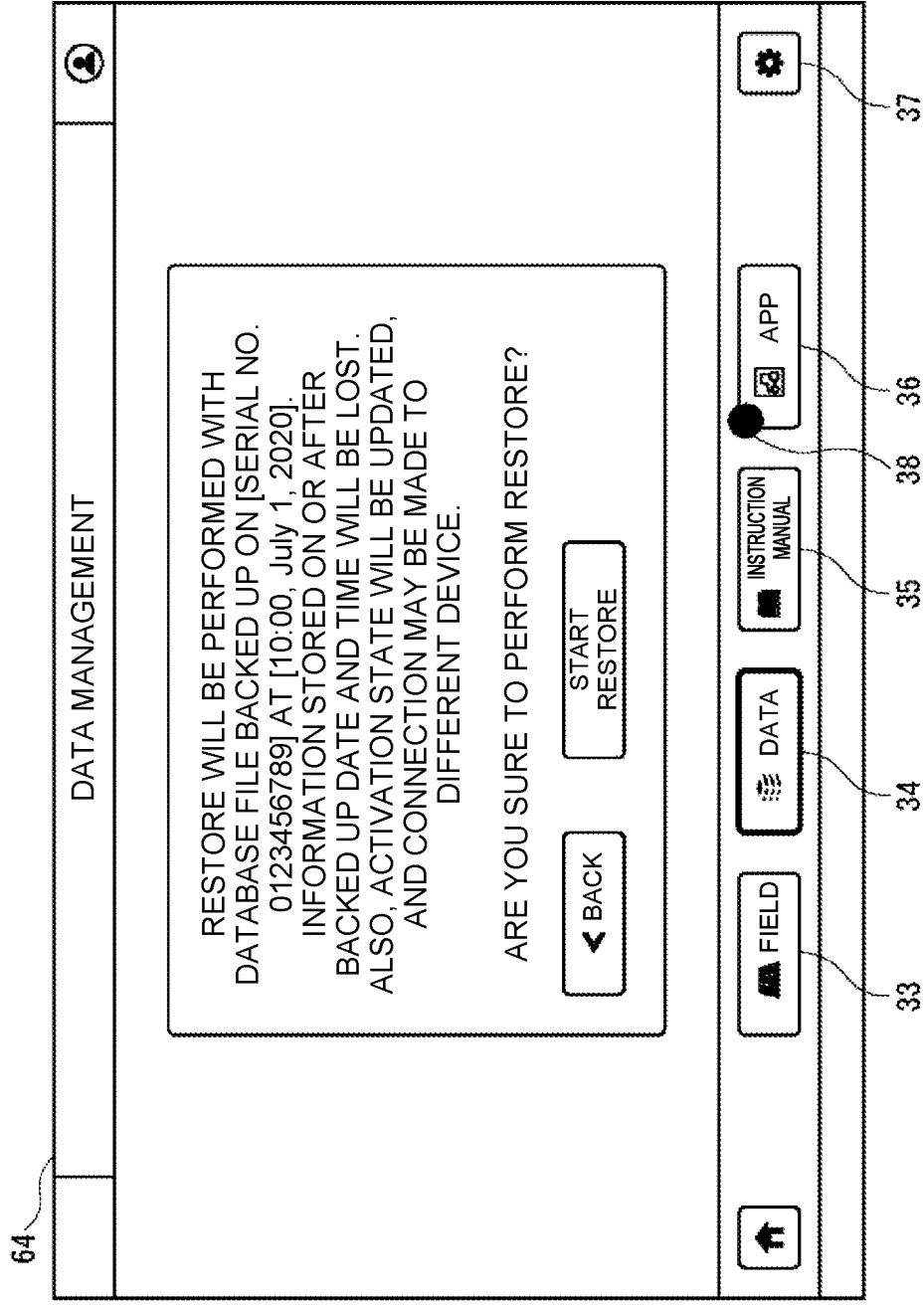
FIG. 13 is a front view illustrating an example of a restore confirmation screen in the management device according to an embodiment of the present invention.
Figure 14:
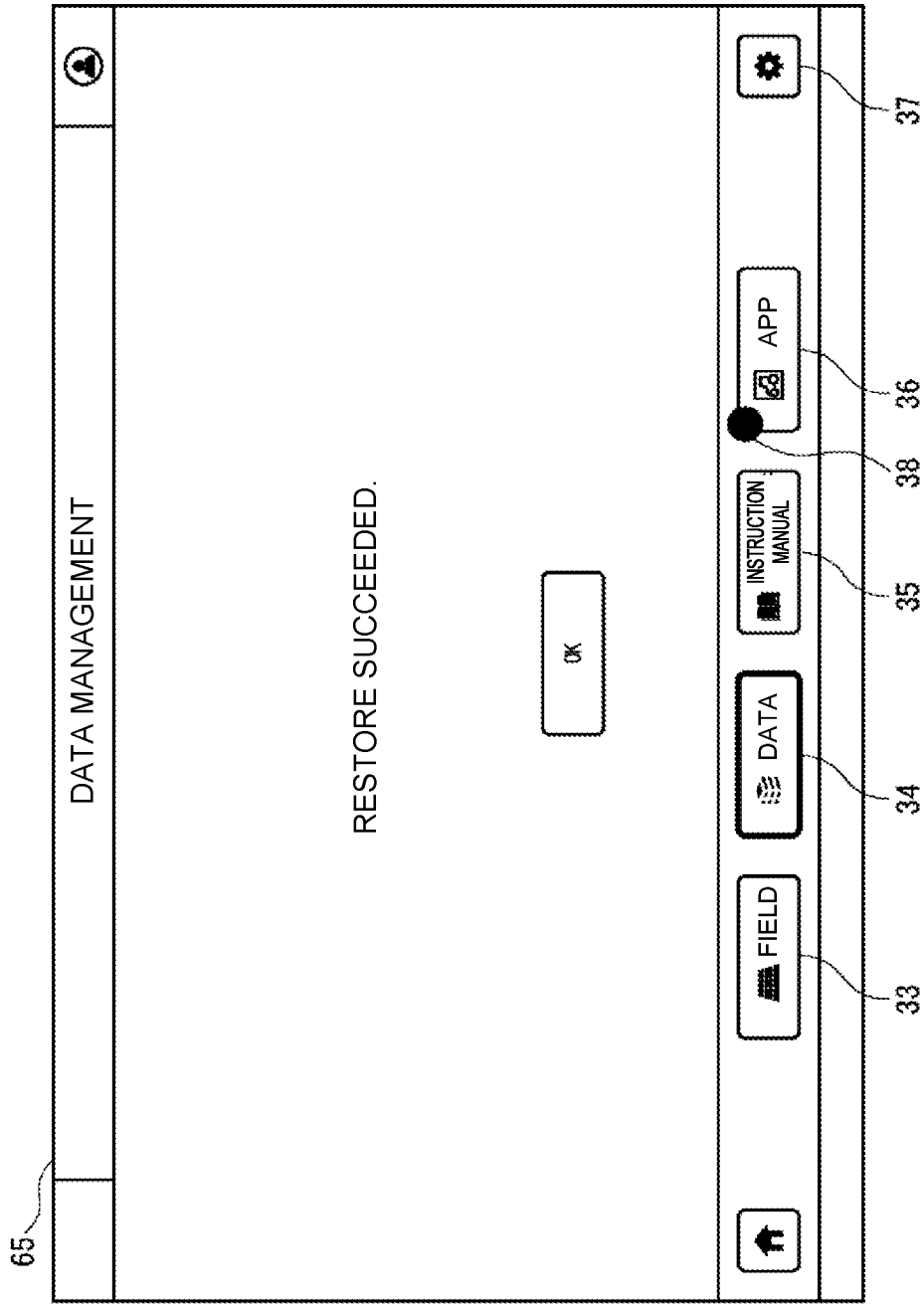
FIG. 14 is a front view illustrating an example of a restore execution screen in the management device according to an embodiment of the present invention.

When the backup data is selected from the data selection field 62 by the selective operation and the data restore is executed, the display control portion 22 displays, on the display portion 13, a restore confirmation screen 64 to confirm with the operator whether a restore of the work machine data can be performed by using the selected backup data, as shown in FIG. 13. If the restore execution is permitted by the operator on the restore confirmation screen 64, the display control portion 22 displays, on the display portion 13, a restore execution screen 65 indicating the restore execution for the work machine data, with respect to the selected backup data, as shown in FIG. 14. The restore execution screen 65 presents, for example, success or failure of the data restore.

Figure 15:
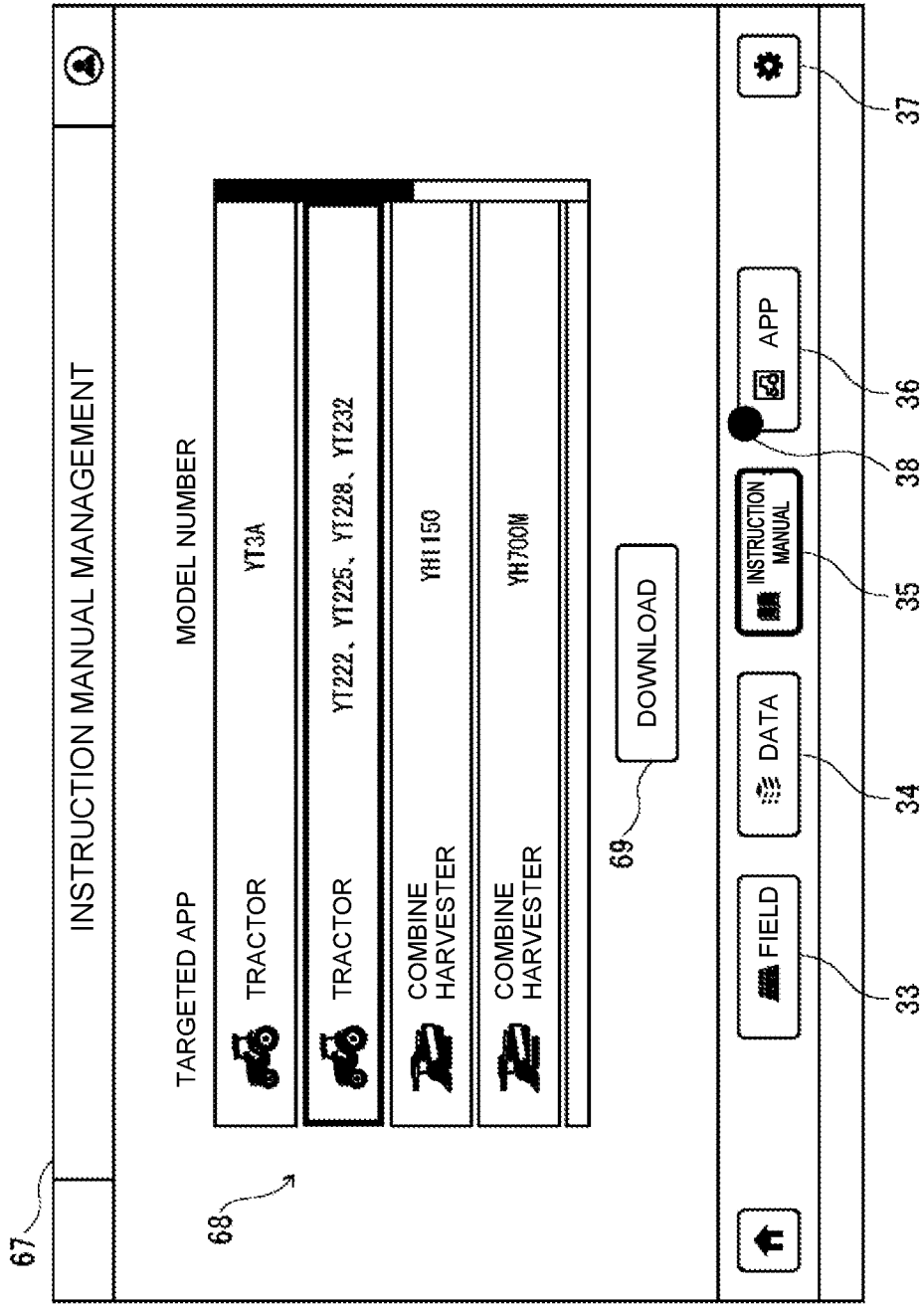
FIG. 15 is a front view illustrating an example of an instruction manual management screen in the management device according to an embodiment of the present invention.

When the instruction manual icon 35 is selectively operated, the display control portion 22 displays, on the display portion 13, an instruction manual management screen 67 (manual management screen) for operation of management of acquisition (download) and the like of instruction manuals regarding the plurality of types of work machines, as shown in FIG. 15. An instruction manual is for explaining the handling of the work machine, and the handling of the corresponding individual application.

The display control portion 22 displays, on the instruction manual management screen 67, an instruction manual selection field 68 in which selective operation can be performed to make a selection from among the work machines, such as the tractor 2, the rice transplanter 3, and the combine harvester 4 of various model numbers (classification information). For example, the display control portion 22 displays, as a list, selection items of the model numbers of the work machines in the instruction manual selection field 68. The instruction manual selection field 68 may display selection items for the model numbers of the work machines whose instruction manuals can be provided by the management server 6, regardless of whether the work machine is one that is registered in the management terminal 5, or one having the individual application installed. Each selection item in the instruction manual selection field 68 is made to display in a simplified way the type, the model number, and the like, of the work machine.

The display control portion 22 operably displays, on the instruction manual management screen 67, a determination button 69 which determines the selective operation of selecting the model number of the work machine in the instruction manual selection field 68. The determination button 69 functions as a download start button. Alternatively, the display control portion 22 may allow the selective operation of selecting the model number of the work machine in the instruction manual selection field 68 to function as the download start button.

Figure 16:
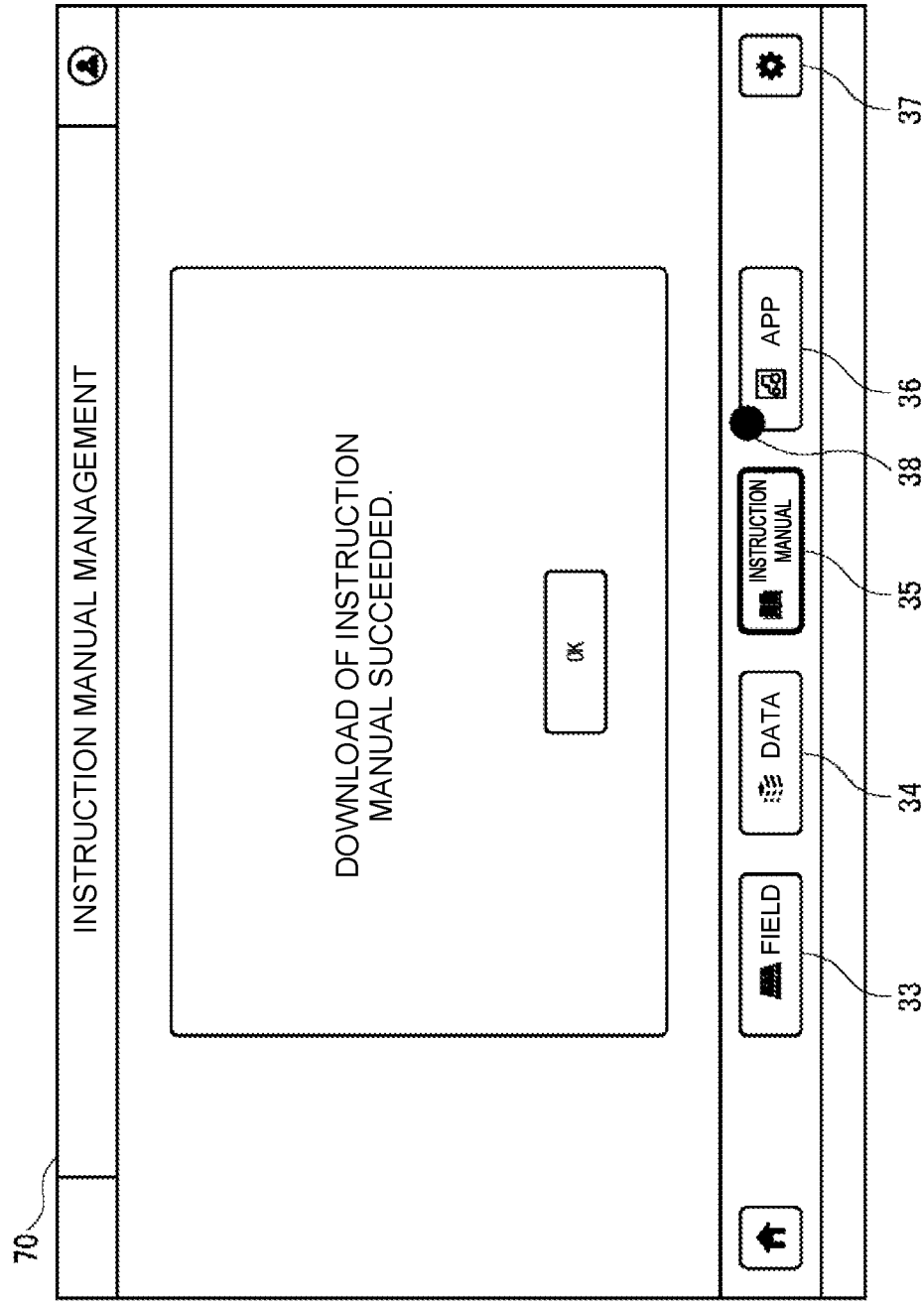
FIG. 16 is a front view illustrating an example of an instruction manual acquisition screen in the management device according to an embodiment of the present invention.

When the model number of the work machine is selected from the instruction manual selection field 68 by the selective operation and the instruction manual download is executed, the display control portion 22 displays, on the display portion 13, an instruction manual acquisition screen 70 indicating acquisition (download) execution for the instruction manual, with respect to the model number of the selected work machine, as shown in FIG. 16. The instruction manual acquisition screen 70 presents, for example, success or failure of the instruction manual acquisition.

Figure 17:
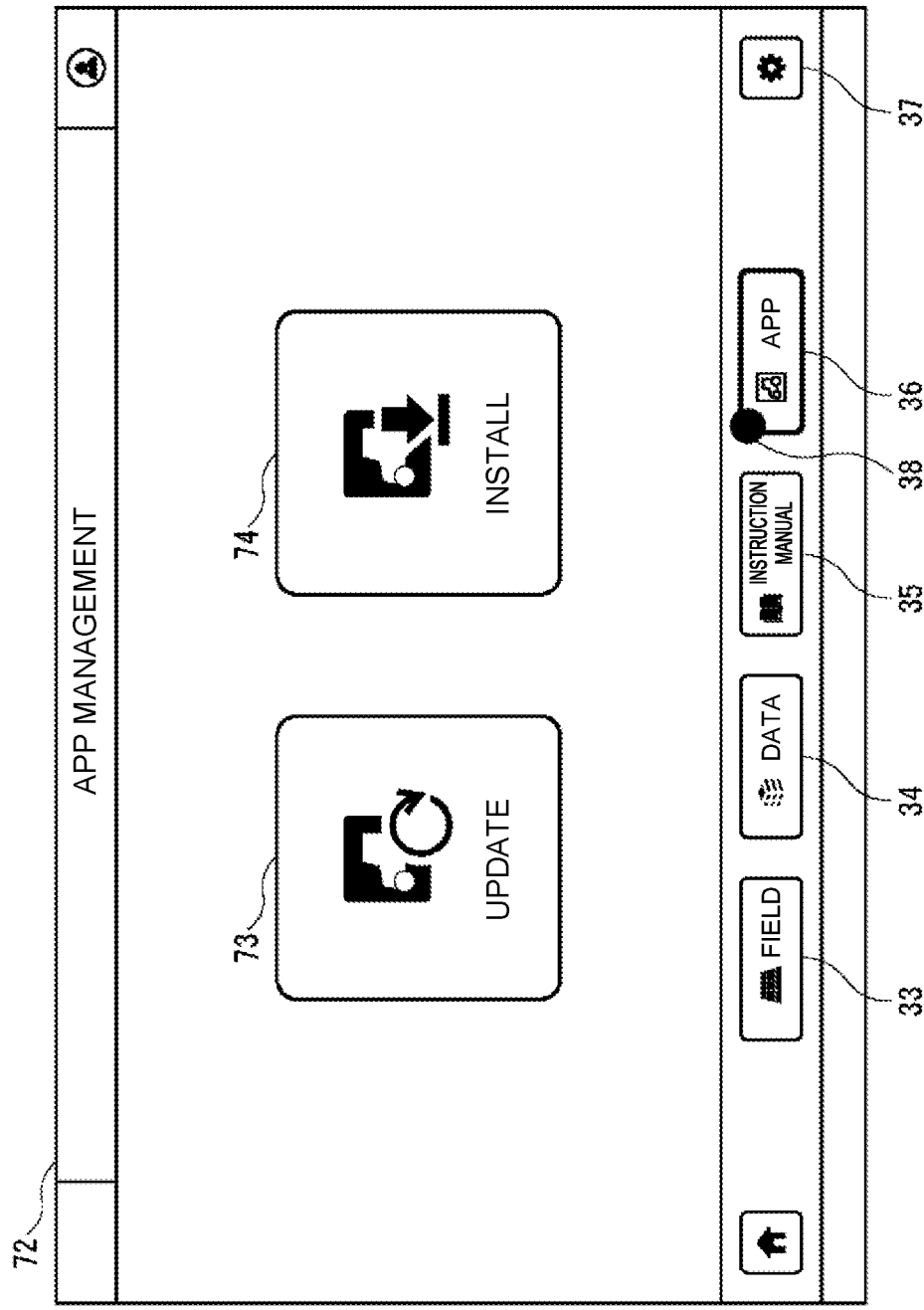
FIG. 17 is a front view illustrating an example of an app management screen in the management device according to an embodiment of the present invention.

When the app icon 36 is selectively operated, the display control portion 22 displays, on the display portion 13, an app management screen 72 for operation of management of acquisition (installation) and the like of applications, as shown in FIG. 17. The display control portion 22 displays, on the app management screen 72, an update icon 73 and an install icon 74 to be selectively operable.

Figure 18:
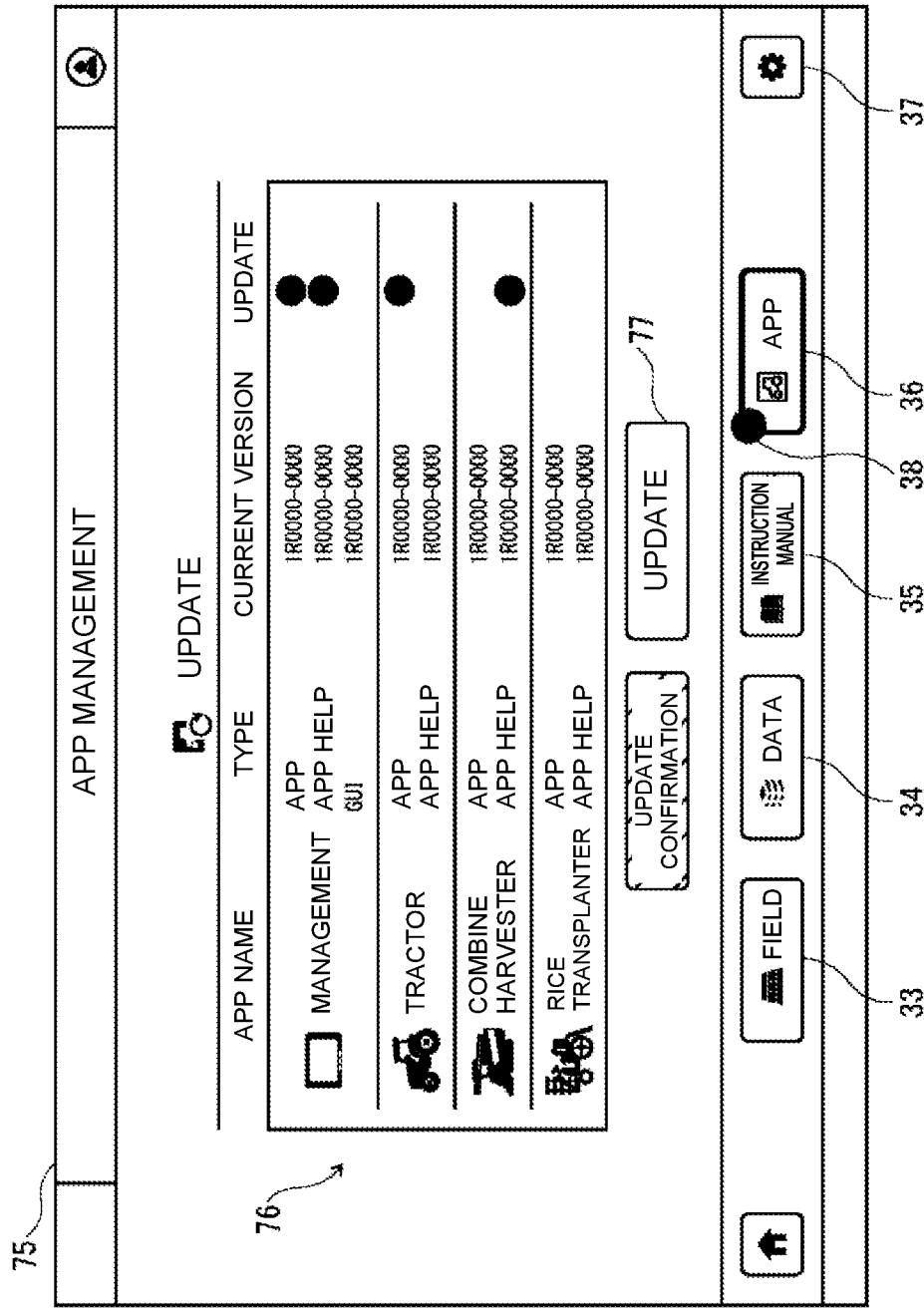
FIG. 18 is a front view illustrating an example of an update management screen in the management device according to an embodiment of the present invention.

When the update icon 73 is selectively operated on the app management screen 72, the display control portion 22 displays, on the display portion 13, an update management screen 75 for operation of an update of the management application or the individual application already installed on the management terminal 5, as shown in FIG. 18.

The display control portion 22 displays as a list the respective app statuses of the management application and the individual applications in an app status field 76, on the update management screen 75. Each app status in the app status field 76 displays in a simplified way the name, the type, and version information of the application, and whether an update is available or not, for example.

For example, the name of the application includes the name such as "Management", which corresponds to the management application, and the names such as "Tractor", "Rice transplanter", and "Combine Harvester", which correspond to the individual applications of the work machines such as the tractor 2, the rice transplanter 3, and the combine harvester 4. Further, the type of the application includes, for example, "App", which corresponds to software (program) of the management application or the individual application, "App Help", which corresponds to the instructions for the management application or the individual application, and "GUI", which corresponds to a screen display of the management application.

Furthermore, whether an update is available or not includes "update available" (denoted by the presence of a black circle in FIG. 18) indicating that the version installed on the management terminal 5 is not the latest one, and "update not available" (denoted by the absence of a black circle in FIG. 18) indicating that the version installed is the latest one. In order to do so, it is sufficient to compare the version of the management application or the individual application being installed on the management terminal 5 with the latest version of the management application or the individual application provided by the management server 6.

The display control portion 22 operably displays, on the update management screen 75, an execution button 77 to perform execution operation for an update of the application. The execution button 77 functions as an update start button. The execution button 77 may be an update start button that initiates all updates for all of the applications indicated as "update available" in the app status field 76, or may be an update start button that initiates the update individually for the application selected in the app status field 76 by selective operation. Alternatively, the display control portion 22 may allow the selective operation of selecting the application in the app status field 76 to function as the update start button.

Figure 19:
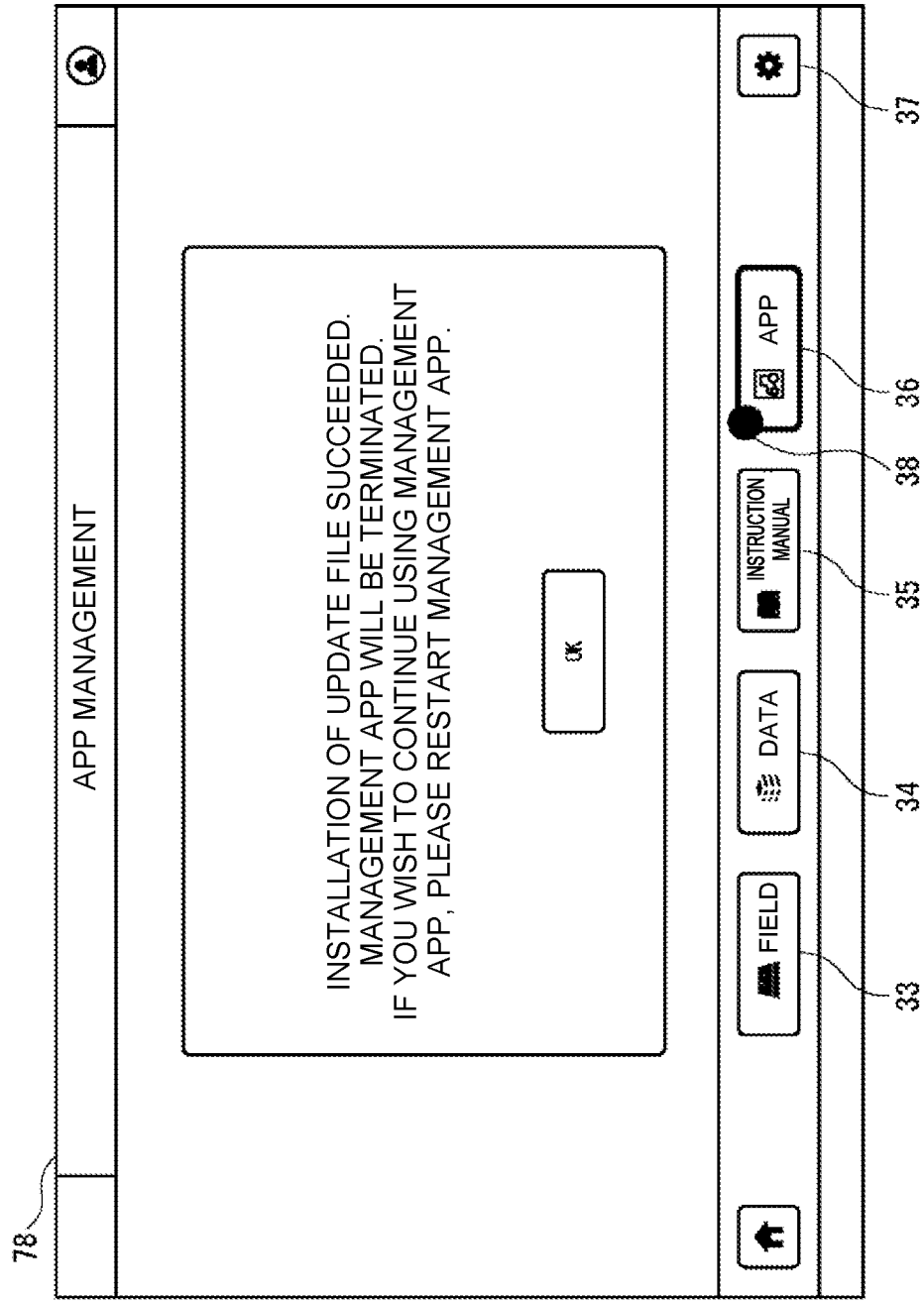
FIG. 19 is a front view illustrating an example of an update execution screen in the management device according to an embodiment of the present invention.

When the execution operation for an update of the application is performed on the update management screen 75, the display control portion 22 displays, on the display portion 13, an update execution screen 78 indicating update execution for the application, as shown in FIG. 19. The update execution screen 78 presents, for example, success or failure of the application update.

Figure 20:
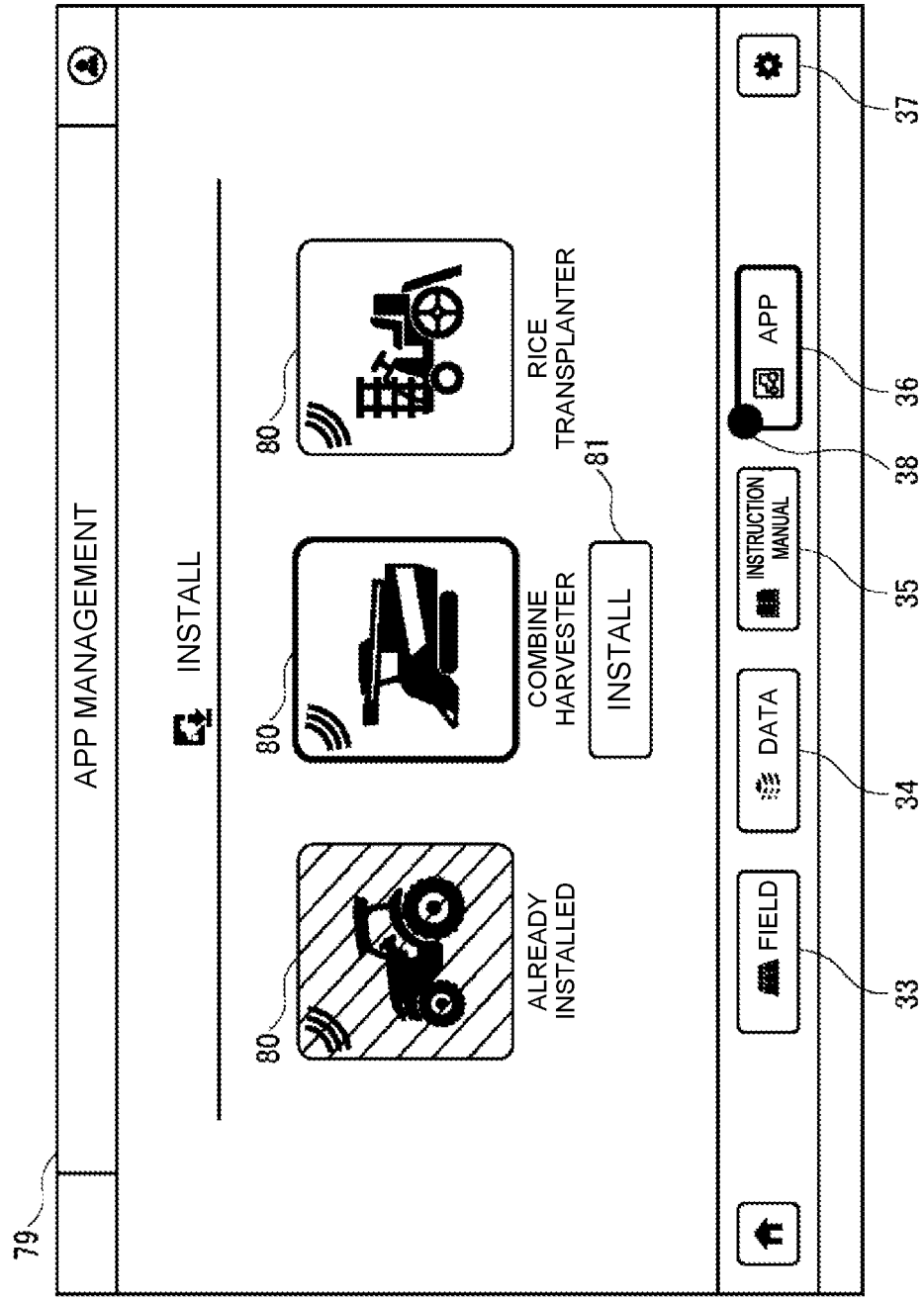
FIG. 20 is a front view illustrating an example of an installation management screen in the management device according to an embodiment of the present invention.

When the install icon 74 is selectively operated on the app management screen 72, the display control portion 22 displays, on the display portion 13, an installation management screen 79 for operation of installation of the individual applications of the plurality of types of work machines, as shown in FIG. 20.

The display control portion 22 displays, on the installation management screen 79, a plurality of individual install icons 80, which respectively correspond to the tractor 2, the rice transplanter 3, and the combine harvester 4, as the plurality of types of work machines, and perform installation operation of installing the respective individual applications, in such a way that the plurality of individual install icons 80 can be selectively operated.

Note that the installation management screen 79 may display an already-installed work machine, which is the work machine in which the individual application is already installed on the management terminal 5, and a yet-to-be installed work machine, which is the work machine in which the individual application is yet to be installed, in such a way that the work machines are displayed distinguishably from each other. For example, while the individual install icon 80 corresponding to the individual application which is yet to be installed is displayed in a normal way to be selectively operable, the individual install icon 80 corresponding to the individual application which is already installed is displayed to be grayed out or not displayed.

The display control portion 22 operably displays, on the installation management screen 79, an execution button 81 to perform execution operation for installation of the application. The execution button 81 functions as an installation start button. Alternatively, the display control portion 22 may allow the selective operation of the individual install icon 80 on the installation management screen 79 to function as the installation start button.

Figure 21:
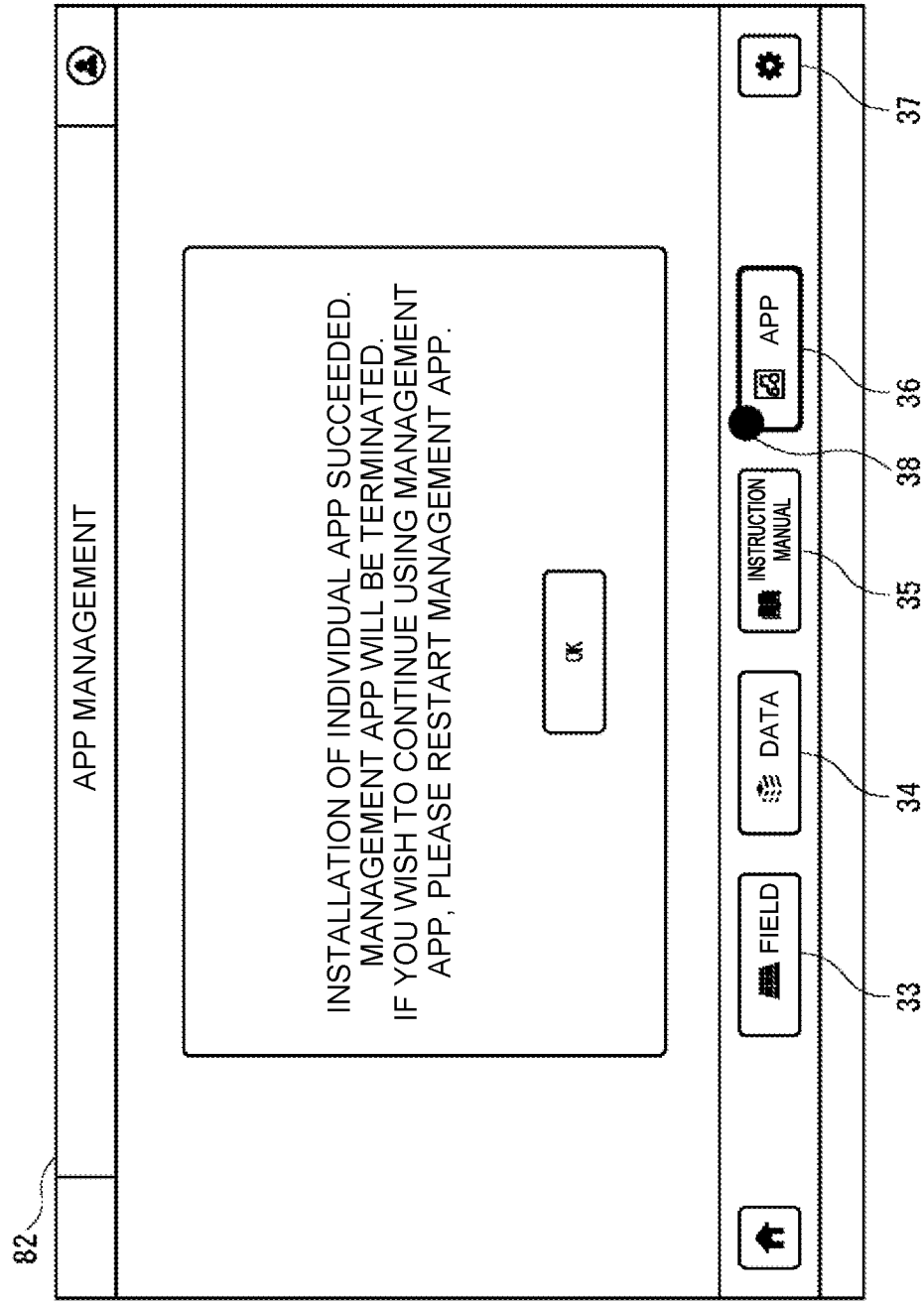
FIG. 21 is a front view illustrating an example of an installation execution screen in the management device according to an embodiment of the present invention.

When any one of the individual install icons 80 of the work machines is selectively operated on the installation management screen 79, and installation of the individual application is executed, the display control portion 22 displays, on the display portion 13, an installation execution screen 82 indicating the installation execution for the individual application of the selected work machine, as shown in FIG. 21. The installation execution screen 82 presents, for example, success or failure of the application installation.

Figure 22:
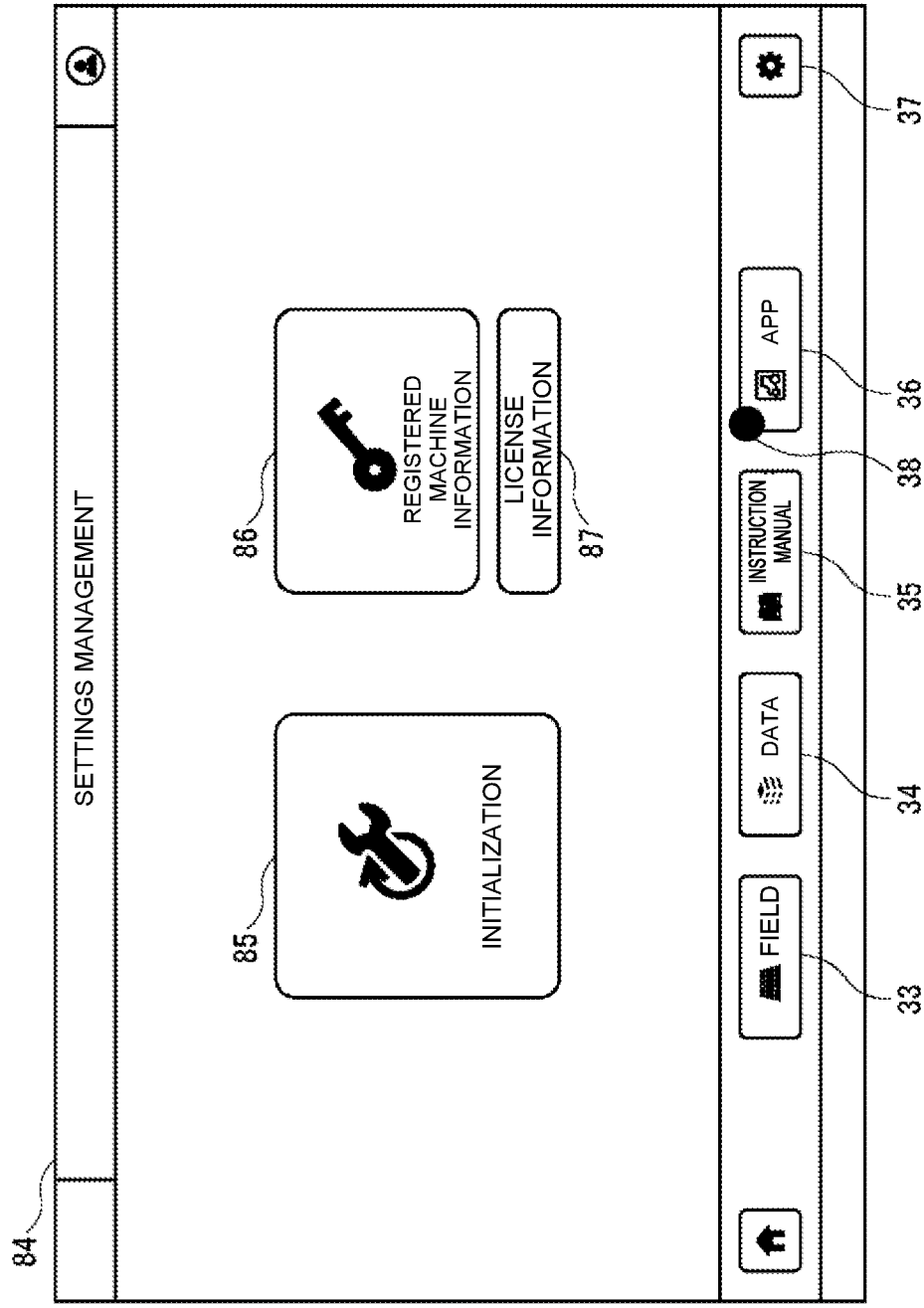
FIG. 22 is a front view illustrating an example of a settings management screen in the management device according to an embodiment of the present invention.

When the settings icon 37 is selectively operated, the display control portion 22 displays, on the display portion 13, a settings management screen 84 for operation of management of setting information and the like of the management application, as shown in FIG. 22. The display control portion 22 displays, on the settings management screen 84, an initialization icon 85, a registered machine information icon 86, and a license icon 87 to be selectively operable.

When the initialization icon 85 is selectively operated on the settings management screen 84, and initialization of the management application is executed, the display control portion 22 displays, on the display portion 13, an initialization execution screen (not shown) indicating the initialization execution for the management application.

Figure 23:
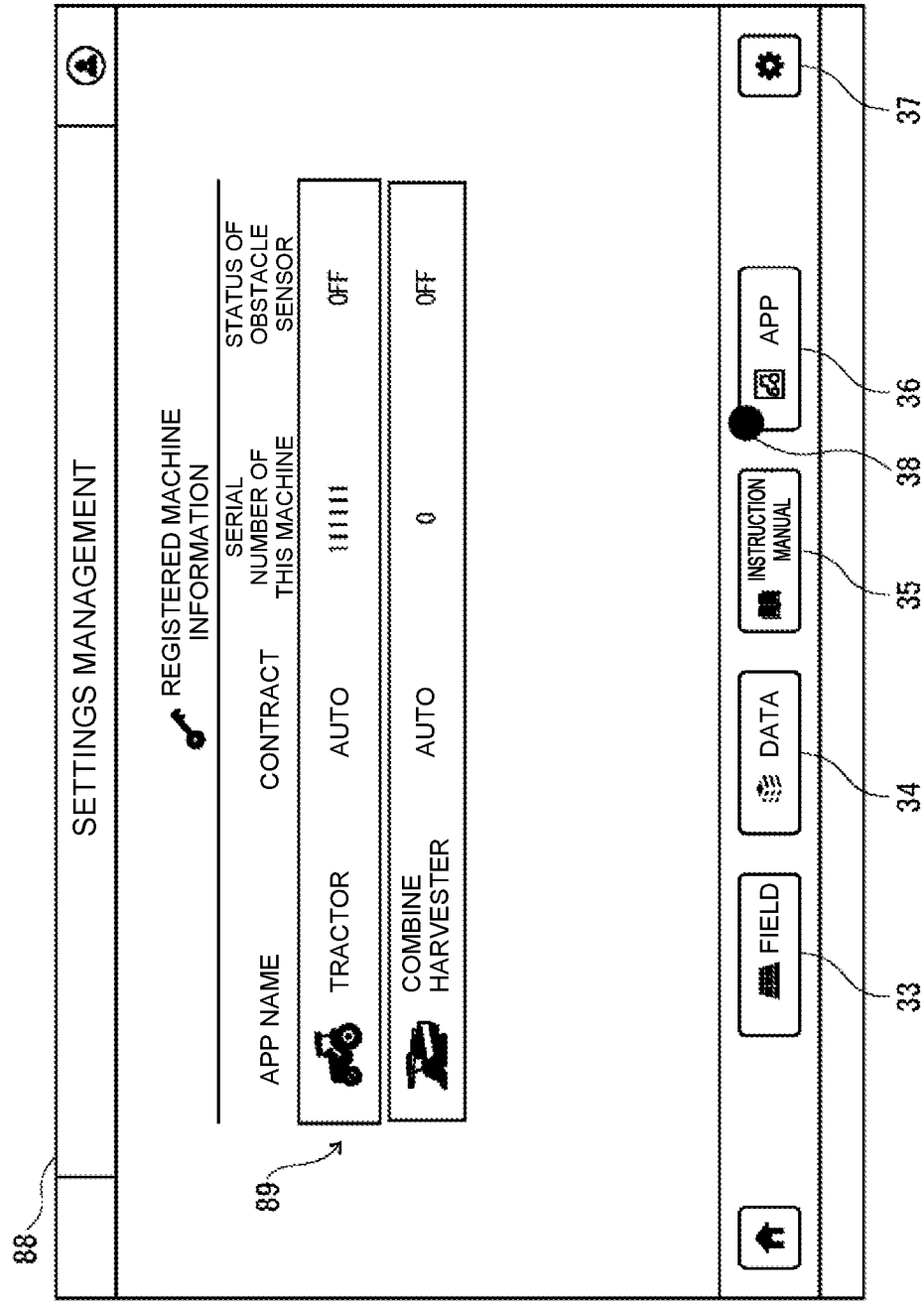
FIG. 23 is a front view illustrating an example of a registered machine information screen in the management device according to an embodiment of the present invention.

When the registered machine information icon 86 is selectively operated on the settings management screen 84, the display control portion 22 displays, on the display portion 13, a registered machine information screen 88 for presenting the registered machine information (activation key) of the work machine registered in the management terminal 5, as shown in FIG. 23. The display control portion 22 displays as a list, on the registered machine information screen 88, pieces of the registered machine information on the work machines, which are registered in the respective management terminals 5, in a registered machine information field 89.

When the license icon 87 is selectively operated on the settings management screen 84, the display control portion 22 displays, on the display portion 13, a license screen (not shown) indicating the license information of the management application.

When any one of the app activation icons 31 is selectively operated on the home screen 30 of the display portion 13, the function control portion 23 controls the second activation portion 21 so as to activate the individual application of the work machine corresponding to the selected app activation icon 31. The management application may be maintained when the individual application is activated, or may be terminated.

When the field management icon 43 is selectively operated on the field management screen 42 of the display portion 13, the function control portion 23 sends, to the management server 6, a request to acquire the created field data which has been registered in the management server 6 by the operator, and receives and acquires the created field data from the management server 6. The function control portion 23 stores the received created field data in a predetermined storage area of the storage portion 11 of the management terminal 5.

Further, when the field acquisition icon 44 is selectively operated on the field management screen 42, the function control portion 23 acquires the analyzed field data obtained by means of the individual application which has analyzed the sections of the field on the basis of the map data. The function control portion 23 stores the acquired analyzed field data in a predetermined storage area of the storage portion 11 of the management terminal 5. As another example, the function control portion 23 may have the function of analyzing the sections of the field on the basis of the map data. As yet another example, the management server 6 or other external servers may have the function of analyzing the sections of the field on the basis of the map data, and the function control portion 23 may make a request to the management server 6 or the other external servers for the analyzed field data, in response to the selective operation of the field acquisition icon 44, and receive the analyzed field data, which has been analyzed by the management server 6 or the other external servers.

When the work machine is selected, on the backup management screen 53 of the display portion 13, from the backup selection field 54 by the selective operation, and an instruction to start the backup is received as the determination button 55 is operated, the function control portion 23 executes the data backup. At this time, the function control portion 23 stores a copy of the work machine data of the selected work machine in a predetermined storage area of the storage portion 11 as the backup data, and sends the data to the management server 6 to have it saved.

After the work machine has been selected by the selective operation on the restore management screen 58 of the display portion 13, when the backup data for use in a restore is selected by the selective operation on the data selection screen 61, and an instruction to start the restore is received as the determination button 63 is operated, the function control portion 23 executes the data restore. At this time, the function control portion 23 receives a copy of the backup data from the management server 6, with respect to the selected work machine, and performs the restore by having the work machine data that is stored in the storage portion 11 rewritten to the received backup data.

When the model number (classification information) of the work machine is selected from the instruction manual selection field 68 by the selective operation on the instruction manual management screen 67 of the display portion 13, and an instruction to acquire the instruction manual is received as the determination button 69 is operated, the function control portion 23 executes the download of the instruction manual. At this time, the function control portion 23 performs the download of the instruction manual, with respect to the model number of the selected work machine, by receiving the instruction manual from the management server 6, and storing it in a predetermined storage area of the storage portion 11.

When an instruction to start the update is received as the execution button 77 is operated on the update management screen 75 of the display portion 13, the function control portion 23 executes the update of the application. At this time, the function control portion 23 receives, from the management server 6, an update file of the application whose update is available in view of the app status, from among the types of applications which constitute the management application and the individual applications. Further, the function control portion 23 performs the update of the application whose update is available by using the received update file.

When the individual install icon 80 is selectively operated on the installation management screen 79 of the display portion 13, and an instruction to start the installation is received as the execution button 81 is operated, the function control portion 23 executes the application installation. At this time, the function control portion 23 receives an installer for the individual application corresponding to the selected individual install icon 80 from the management server 6. Further, the function control portion 23 installs the individual applications by using the received installer.

As described above, according to the present embodiment, the management terminal 5, which manages one of the tractor 2, the rice transplanter 3, and the combine harvester 4, as the plurality of types of work machines that perform a plurality of types of work, respectively, on a field, is provided with the storage portion 11 which stores the management application for managing the plurality of types of work machines, the control device 10 which activates the management application, and the display portion 13. When the control device 10 activates the management application, the control device 10 displays, on the display portion 13, the plurality of app activation icons 31 corresponding to the plurality of types of work machines, respectively, in such a way that the plurality of app activation icons 31 are selectively operable. Also, the control device 10 activates, in response to the selective operation of any one of the plurality of app activation icons 31, the individual application for operating the work machine corresponding to the selectively operated app activation icon 31.

Also, according to the present embodiment, a management method of managing a plurality of types of work machines that perform a plurality of types of work, respectively, on the same work area includes: a first activation process of activating, in the management terminal 5 of the operator, a management application for managing the plurality of types of work machines; a display control process of displaying, by the management application, the plurality of app activation icons 31, which respectively correspond to the plurality of types of work machines, to be selectively operable on the display portion 13 of the management terminal 5; and a second activation process of activating, in response to selective operation of any one of the plurality of app activation icons 31, an individual application for operating the work machine corresponding to the selectively operated app activation icon 31, in the management terminal 5.

By this feature, it is possible to easily manage a plurality of types of work machines, and the individual applications respectively corresponding thereto by using a single management application. Accordingly, it is possible to improve the convenience of managing the plurality of types of work machines.

Specifically, the work machine is constituted by a farmwork machine, such as the tractor 2, the rice transplanter 3, and the combine harvester 4. Thus, it is possible to easily manage a plurality of types of farmwork machines, and individual applications respectively corresponding thereto by using a single management application. Accordingly, it is possible to improve the convenience of managing the plurality of types of farmwork machines.

According to the present embodiment, the display control process displays, on the same home screen 30 as that which displays the plurality of app activation icons 31 at the display portion 13, notification information, which is related to management of the work machines, to be selectively operable, and displays, in response to selective operation of the notification information, a detailed screen 40 for the selectively operated notification information on the display portion 13.

Thus, by the selective operation of the notification information displayed on the same screen as that which displays the app activation icons 31 for activating the individual applications of the work machines, the screen is switched to the detailed screen 40 for the notification information. Consequently, not only is it possible to easily ascertain the notification information, but it is also possible to switch the screen to the detailed screen 40 with ease, and the convenience can thereby be improved.

According to the present embodiment, the display control process displays, on the same home screen 30 as that which displays the plurality of app activation icons 31 at the display portion 13, the field icon 33 for operation of data management of a field, which is the work area, in which the work machine performs the work, to be selectively operable. Also, the display control process displays, in response to selective operation of the field icon 33, the field management icon 43 and the field acquisition icon 44 to be selectively operable. Further, the function control process of the management method includes: a process of acquiring, in response to selective operation of the field management icon 43, created field data created from the past autonomous traveling of the work machine; and a process of acquiring, in response to selective operation of the field acquisition icon 44, analyzed field data analyzed from map data.

Thus, by the selective operation of the field icon 33 displayed on the same screen as that which displays the app activation icons 31 for activating the individual applications of the work machines, the field management icon 43 and the field acquisition icon 44 are displayed simultaneously. Consequently, not only is it possible to easily manage the field, but it is also possible to acquire the created field data and the analyzed field data with ease, and the convenience can thereby be improved.

According to the present embodiment, the display control process displays, on the same home screen 30 as that which displays the plurality of app activation icons 31 at the display portion 13, the data icon 34 for operation of data management, which is related to the work machine data used in the individual applications of the plurality of types of work machines, to be selectively operable. Also, the display control process displays, in response to selective operation of the data icon 34, the backup icon 50 and the restore icon 51 to be selectively operable. Further, the display control process displays, in response to selective operation of the backup icon 50, the backup management screen 53 for operation of data backup of the work machine; and displays, in response to selective operation of the restore icon 51, the restore management screen 58 for operation of data restore of the work machine.

Thus, by the selective operation of the data icon 34 displayed on the same screen as that which displays the app activation icons 31 for activating the individual applications of the work machines, the backup icon 50 and the restore icon 51 are displayed simultaneously. Furthermore, by the selective operation of the backup icon 50, the screen is switched to the backup management screen 53, and by the selective operation of the restore icon 51, the screen is switched to the restore management screen 58. Consequently, not only is it possible to easily manage the backup of the work machine data, but it is also possible to perform the backup or restore of the work machine data with ease, and the convenience can thereby be improved.

According to the present embodiment, the display control process displays, on the same home screen 30 as that which displays the plurality of app activation icons 31 at the display portion 13, the instruction manual icon 35 for operation of management of the instruction manuals of the plurality of types of work machines, in such a way that the instruction manual icon 35 is selectively operable. Also, the display control process displays, in response to selective operation of the instruction manual icon 35, the instruction manual management screen 67 for download of an instruction manual of the work machine; and displays, on the instruction manual management screen 67, models numbers as a plurality of pieces of classification information for the plurality of types of work machines, in such a way that the model numbers can be selected by selective operation. Further, the function control process includes a process of downloading, in response to selective operation of selecting the model number, the instruction manual of the work machine corresponding to the selectively operated model number.

Thus, by the selective operation of the instruction manual icon 35 displayed on the same screen as that which displays the app activation icons 31 for activating the individual applications of the work machines, the screen is switched to the instruction manual management screen 67 on which the model number of the work machine is displayed for each instruction manual. Further, by performing selective operation to select the model number of the work machine, an instruction manual corresponding to that model number is downloaded. Consequently, not only is it possible to easily manage the instruction manuals of the work machines, but it is also possible to perform the download of the instruction manual with ease, and the convenience can thereby be improved.

According to the present embodiment, the display control process displays, on the same screen as that which displays the plurality of app activation icons 31 at the display portion 13, the app icon 36 for managing the individual applications of the plurality of types of work machines, in such a way that the app icon 36 is selectively operable. Also, the display control process displays, in response to selective operation of the app icon 36, the update icon 73 and the install icon 74 to be selectively operable. Further, the display control process displays, in response to selective operation of the update icon 73, the update management screen 75 for operation of update of the individual application; and displays, in response to selective operation of the install icon 74, the installation management screen 79 for operation of installation of the individual application.

Thus, by the selective operation of the app icon 36 displayed on the same screen as that which displays the app activation icons 31 for activating the individual applications of the work machines, the update icon 73 and the install icon 74 are displayed simultaneously. Furthermore, by the selective operation of the update icon 73, the screen is switched to the update management screen 75, and by the selective operation of the install icon 74, the screen is switched to the installation management screen 79. Consequently, not only is it possible to easily manage the update or installation of the application, but it is also possible to perform the update or installation with ease, and the convenience can thereby be improved.

According to the present embodiment, the display control process displays, on the installation management screen 79, the work machine in which the individual application is already installed and the work machine in which the individual application is yet to be installed, in such a way that the work machines are displayed distinguishably from each other.

By this feature, it is possible to visually determine whether the individual application is already installed or not, and the convenience of management of the individual applications can thereby be improved.

In the above embodiment, an example in which the work machine of the present invention is constituted by a farm-work machine, such as the tractor 2, the rice transplanter 3, and the combine harvester 4, has been described. However, the present invention is not limited to the above example, and it is sufficient if the work machine of the present invention is constituted by machines which respectively perform different work on the same work area.

Note that the present invention can be modified as appropriate to the extent not departing form the gist or spirit of the invention that can be read from the claims and the specification as a whole. That is, a management method, a management terminal, and a management system with such modifications are also included in the technical concept of the present invention.

REFERENCE SIGNS LIST

1 Management system
2 Tractor (work machine)
3 Rice transplanter (work machine)
4 Combine harvester (work machine)
5 Management terminal
6 Management server
10 Control device
11 Storage portion
13 Display portion
20 First activation portion
21 Second activation portion
22 Display control portion
23 Function control portion
30 Home screen
31 App activation icon
32 Notification information field
33 Field icon
34 Data icon
35 Instruction manual icon
36 App icon
40 Detailed screen
42 Field management screen
43 Field management icon
44 Field acquisition icon
46 Created field data acquisition screen
47 Analyzed field data acquisition screen
49 Data management screen
50 Backup icon
51 Restore icon
53 Backup management screen
58 Restore management screen
67 Instruction manual management screen
72 App management screen
73 Update icon
74 Install icon
75 Update management screen
79 Installation management screen

The invention claimed is:

1. A management method of managing a plurality of types of work machines that perform a plurality of types of work, respectively, on a same work area, the management method comprising:
   a first activation process of activating, in a terminal of an operator, a management application for managing the plurality of types of work machines;
   a display control process of displaying, by the management application, a plurality of app activation icons, which respectively correspond to the plurality of types of work machines, to be selectively operable on a display portion of the terminal; and
   a second activation process of activating, in response to selective operation of any one of the plurality of app activation icons, an individual application for operating the work machine corresponding to the selectively operated app activation icon, in the terminal,
   wherein the display control process,
   displays, on a same screen as that which displays the plurality of app activation icons at the display portion, a field icon for operation of data management of a field, which is the work area, to be selectively operable; and a process of acquiring, in response to selective operation of a field management icon, created field data created from past autonomous traveling of the work machine.

2. The management method according to claim 1, wherein the display control process displays, on a same screen as that which displays the plurality of app activation icons at the display portion, notification information, which is related to management of the work machines, to be selectively operable, and displays, in response to selective operation of the notification information, a detailed screen for the selectively operated notification information on the display portion.

3. The management method according to claim 1, wherein the display control process:
displays, in response to selective operation of the field icon, the field management icon and a field acquisition icon to be selectively operable,
the management method further comprising:
a process of acquiring, in response to selective operation of the field acquisition icon, analyzed field data analyzed from map data.

4. The management method according to claim 1, wherein the display control process:
displays, on the same screen as that which displays the plurality of app activation icons at the display portion, a data icon for operation of data management of the plurality of types of work machines, in such a way that the data icon is selectively operable;
displays, in response to selective operation of the data icon, a backup icon and a restore icon to be selectively operable;
displays, in response to selective operation of the backup icon, a backup management screen for operation of data backup of the work machine; and
displays, in response to selective operation of the restore icon, a restore management screen for operation of data restore of the work machine.

5. The management method according to claim 1, wherein the display control process:
displays, on the same screen as that which displays the plurality of app activation icons at the display portion, an instruction manual icon for operation of management of instruction manuals of the plurality of types of work machines, in such a way that the instruction manual icon is selectively operable;
displays, in response to selective operation of the instruction manual icon, an instruction manual management screen for download of an instruction manual of the work machines; and
displays, on the instruction manual management screen, a plurality of pieces of classification information for the plurality of types of work machines, in such a way that the plurality of pieces of classification information are selectively operable,
the management method further comprising a process of downloading, in response to selective operation of selecting the classification information, the instruction manual of the work machine corresponding to the selectively operated classification information.

6. The management method according to claim 1, wherein the display control process:
displays, on the same screen as that which displays the plurality of app activation icons at the display portion, an app icon for management of the individual applications of the plurality of types of work machines, in such a way that the app icon is selectively operable;
displays, in response to selective operation of the app icon, an update icon and an install icon to be selectively operable;
displays, in response to selective operation of the update icon, an update management screen for operation of update of the individual application; and
displays, in response to selective operation of the install icon, an installation management screen for operation of installation of the individual application.

7. The management method according to claim 6, wherein the display control process displays, on the installation management screen, the work machine in which the individual application is already installed and the work machine in which the individual application is yet to be installed, in such a way that the work machines are displayed distinguishably from each other.

8. The management method according to claim 1, wherein the work machine is a farmwork machine.

9. A management terminal which manages a plurality of types of work machines that perform a plurality of types of work, respectively, on a field, the management terminal comprising:
a computer readable non-transitory storage portion which stores a management application for managing the plurality of types of work machines;
a control device which activates the management application; and
a display portion,
wherein the control device:
displays, when the management application is activated, a plurality of app activation icons, which respectively correspond to the plurality of types of work machines, to be selectively operable on the display portion; and
activates, in response to selective operation of any one of the plurality of app activation icons, an individual application stored in the computer readable non-transitory storage portion for operating the work machine corresponding to the selectively operated app activation icon,
displays, on a same screen as that which displays the plurality of app activation icons at the display portion, a field icon for operation of data management of a field, which is the work area, to be selectively operable,
displays, in response to selective operation of the field icon, a field management icon and a field acquisition icon to be selectively operable, and
acquires, in response to selective operation of the field management icon, created field data created from past autonomous traveling of the work machine.

10. A management system comprising:
a plurality of types of work machines that perform a plurality of types of work on a field, in which the management system manages:
a terminal of an operator, that activates a management application for managing the plurality of types of work machines; and,
a display that displays, by the management application, a plurality of app activation icons, which respectively correspond to the plurality of types of work machines, to be selectively operable on a display portion of the terminal,
wherein the terminal activates, in response to selective operation of any one of the plurality of app activation icons, an individual application for operating the work machine corresponding to the selectively operated app activation icon, wherein the management system displays, on a same screen as that which displays the plurality of app activation icons at the display portion, a field icon for operation of data management of a field, which is the work area, to be selectively operable, and displays, in response to selective operation of the field icon, a field management icon and a field acquisition icon to be selectively operable, wherein a process of the terminal acquires, in response to selective operation of the field management icon, created field data created from past autonomous traveling of the work machine.

11. The management terminal according to claim 9, the management terminal comprising:

a process of acquiring, in response to selective operation of the field acquisition icon, analyzed field data analyzed from map data.

12. The management terminal according to claim 9, wherein the control device:

displays, on the same screen as that which displays the plurality of app activation icons at the display portion, a data icon for operation of data management of the plurality of types of work machines, in such a way that the data icon is selectively operable;

displays, in response to selective operation of the data icon, a backup icon and a restore icon to be selectively operable;

displays, in response to selective operation of the backup icon, a backup management screen for operation of data backup of the work machine; and displays, in response to selective operation of the restore icon, a restore management screen for operation of data restore of the work machine.

13. The management terminal according to claim 9, wherein the control device:

displays, on the same screen as that which displays the plurality of app activation icons at the display portion, an instruction manual icon for operation of management of instruction manuals of the plurality of types of work machines, in such a way that the instruction manual icon is selectively operable;

displays, in response to selective operation of the instruction manual icon, an instruction manual management screen for download of an instruction manual of the work machines; and displays, on the instruction manual management screen, a plurality of pieces of classification information for the plurality of types of work machines, in such a way that the plurality of pieces of classification information are selectively operable, the management terminal further comprising a process of downloading, in response to selective operation of selecting the classification information, the instruction manual of the work machine corresponding to the selectively operated classification information.

14. The management terminal according to claim 9, wherein the control device:

displays, on the same screen as that which displays the plurality of app activation icons at the display portion, an app icon for management of the individual applications of the plurality of types of work machines, in such a way that the app icon is selectively operable;

displays, in response to selective operation of the app icon, an update icon and an install icon to be selectively operable;

displays, in response to selective operation of the update icon, an update management screen for operation of update of the individual application; and displays, in response to selective operation of the install icon, an installation management screen for operation of installation of the individual application.

15. The management terminal according to claim 14, wherein the control device displays, on the installation management screen, the work machine in which the individual application is already installed and the work machine in which the individual application is yet to be installed, in such a way that the work machines are displayed distinguishably from each other.

16. The management system according to claim 10, wherein the control device:

the management terminal further comprising:

a process of acquiring, in response to selective operation of the field acquisition icon, analyzed field data analyzed from map data.

17. The management system according to claim 10, wherein the management system:

displays, on the same screen as that which displays the plurality of app activation icons at the display portion, a data icon for operation of data management of the plurality of types of work machines, in such a way that the data icon is selectively operable;

displays, in response to selective operation of the data icon, a backup icon and a restore icon to be selectively operable;

displays, in response to selective operation of the backup icon, a backup management screen for operation of data backup of the work machine; and displays, in response to selective operation of the restore icon, a restore management screen for operation of data restore of the work machine.

18. The management system according to claim 10, wherein the management system:

displays, on the same screen as that which displays the plurality of app activation icons at the display portion, an instruction manual icon for operation of management of instruction manuals of the plurality of types of work machines, in such a way that the instruction manual icon is selectively operable;

displays, in response to selective operation of the instruction manual icon, an instruction manual management screen for download of an instruction manual of the work machines; and displays, on the instruction manual management screen, a plurality of pieces of classification information for the plurality of types of work machines, in such a way that the plurality of pieces of classification information are selectively operable, the management system further comprising a process of downloading, in response to selective operation of selecting the classification information, the instruction manual of the work machine corresponding to the selectively operated classification information.

19. The management system according to claim 10, wherein the management system:

displays, on the same screen as that which displays the plurality of app activation icons at the display portion, an app icon for management of the individual applications of the plurality of types of work machines, in such a way that the app icon is selectively operable;

displays, in response to selective operation of the app icon, an update icon and an install icon to be selectively operable;

displays, in response to selective operation of the update icon, an update management screen for operation of update of the individual application; and displays, in response to selective operation of the install icon, an installation management screen for operation of installation of the individual application.

20. The management system according to claim 19, wherein the display control process displays, on the installation management screen, the work machine in which the individual application is already installed and the work machine in which the individual application is yet to be installed, in such a way that the work machines are displayed distinguishably from each other.

* * * * *